(12) United States Patent
Ha et al.

(10) Patent No.: US 12,367,433 B2
(45) Date of Patent: Jul. 22, 2025

(54) METHOD, APPARATUS, AND SYSTEM FOR ALLOCATING A MOVING OBJECT FOR A FLEET SYSTEM

(71) Applicants: HYUNDAI MOTOR COMPANY, Seoul (KR); KIA CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 649 days.

(21) Appl. No.: 17/408,083

(22) Filed: Aug. 20, 2021

(65) Prior Publication Data
US 2022/0058533 A1  Feb. 24, 2022

(30) Foreign Application Priority Data

Aug. 24, 2020 (KR) .................. 10-2020-0106493
Apr. 5, 2021 (KR) .................. 10-2021-0043815

(51) Int. Cl.
*G06Q 10/02* (2012.01)
*G06Q 50/40* (2024.01)

(52) U.S. Cl.
CPC .............. *G06Q 10/02* (2013.01); *G06Q 50/40* (2024.01)

(58) Field of Classification Search
CPC ........ G06Q 10/02; G06Q 50/30; G06Q 50/40; G06Q 50/43; G06Q 50/47
See application file for complete search history.

(56) References Cited

U.S. PATENT DOCUMENTS

| | | | |
|---|---|---|---|
| 2003/0187720 A1* | 10/2003 | Takada | G06Q 30/0202 705/13 |
| 2017/0091856 A1* | 3/2017 | Canberk | G06Q 30/0609 |
| 2018/0211349 A1* | 7/2018 | Knox | H04W 52/0261 |
| 2019/0236960 A1* | 8/2019 | Sakurada | H04W 4/40 |
| 2019/0244261 A1* | 8/2019 | Sakurada | G06T 7/0002 |
| 2019/0318275 A1* | 10/2019 | Sakurada | G06Q 10/02 |
| 2019/0347582 A1* | 11/2019 | Allen | G06Q 10/02 |
| 2019/0376805 A1* | 12/2019 | Whitt | B60Q 1/444 |
| 2020/0400444 A1* | 12/2020 | Quaid | G01C 21/3476 |
| 2021/0302174 A1* | 9/2021 | Abdulla | H04W 4/40 |

OTHER PUBLICATIONS

Dong, Yongqi, et. al., "An empirical study on travel pattersn of internet based ride-sharing", 2018, Transportation Research Part C: Emerging Technologies, vol. 86, pp. 1-22 (Year: 2018).*

\* cited by examiner

*Primary Examiner* — Jeff Zimmerman
*Assistant Examiner* — Wayne S. Murray
(74) *Attorney, Agent, or Firm* — Lempia Summerfield Katz LLC

(57) ABSTRACT

A method, an apparatus and a system for allocating a moving object for a fleet system may be provided. The fleet system has a fleet spot divided into a multiplicity of zones provided as accommodating space of a moving object. The method includes: receiving, in a server, a use request of the moving object from a user device; transmitting, in the server, an available moving object list including at least one zone and an available moving object of the zone in compliance with the use request to the user device; receiving, in the server, reservation information based on a moving object that the user device selects in the available moving object list; and allocating the moving object to the user device based on the reservation information.

19 Claims, 13 Drawing Sheets

FIG. 8

| USER | USE STATUS INFORMATION | | EVALUATION INFORMATION | RATING LEVEL |
|---|---|---|---|---|
| | TERM OF CONTRACT (MONTH) | USE PERFORMANCE (HOUR) | | |
| a | 6 | 70 | intermediate | B |
| b | 12 | 80 | excellent | A |
| c | 24 | 160 | excellent | S |
| d | 6 | 55 | intermediate | C |
| e | 18 | 90 | top | A |
| ... | ... | ... | ... | ... |

| RATING LEVEL | VEHICLE SPECIFICATION | MODEL YEAR (YEAR; RECOMMENDED) | CLEANLINESS (RECOMMENDED) | ALLOCATED ZONE (RECOMMENDED) | LONG-TERM VEHICLE/ DESIGNATED PARKING LOT | PENALTY |
|---|---|---|---|---|---|---|
| S | top~low | 1~2 | A++ | neighboring zone recommended | applicable | exempt |
| A | high~low | 2~4 | A+ | neighboring zone recommended | applicable | exempt |
| B | middle~low | 3~5 | A | neighboring zone irrelevant | non-applicable | applied |
| C | low | 4~6 | B | neighboring zone irrelevant | non-applicable | applied |

* Recommendation: basically applied when there is a vehicle corresponding to the item, check and present lower items in sequence when no corresponding item exists

FIG. 9

METHOD, APPARATUS, AND SYSTEM FOR ALLOCATING A MOVING OBJECT FOR A FLEET SYSTEM

CROSS REFERENCE TO RELATED APPLICATION

The present application claims priority to Korean patent application Nos. 10-2020-0106493, filed Aug. 24, 2020 and 10-2021-0043815, filed Apr. 5, 2021, the entire contents of which are incorporated herein for all purposes by this reference.

BACKGROUND

Field of the Disclosure

The present disclosure relates to a method and an apparatus for allocating a moving object for a fleet system that is implemented by a computing device. Particularly, the present disclosure relates to a method and an apparatus for allocating a shared moving object by using a fleet system.

Description of the Related Art

Along with technical advances, the notion of car ownership is declining, while the use of shared cars is increasing. Specifically, for the convenience of everyday life in a particular region or residence, the needs for shared vehicles and related services are increasing. For the smooth use of shared moving objects in an area crowded with users, many moving objects may be kept and managed near the crowded area.

As the existing shared moving object service manages a small number of shared moving objects distributed over many points, the existing allocation service informs each user only of a shared moving object and a parking area. However, when many shared moving objects are concentrated in one area, it means that the moving objects are being kept across a wide area. In case of allocating a moving object simply available in a parking area, not allocating a shared moving object in a specific zone of the parking area, any user may experience inconvenience of being allocated a moving object far away from a current or expected location of the user. In addition, there is no method of allocating a same type of moving objects kept in multiple specific zones according to the use history and service evaluation of a user or a user group frequently using moving objects in a particular parking area. Hereinafter, in view of the background described above, a method for allocating a moving object for a fleet system is provided.

SUMMARY

The present disclosure may provide a method and an apparatus for allocating efficiently a moving object to serve a user's purpose by using a fleet system that is implemented by a computing device.

The technical objects of the present disclosure are not limited to the above-mentioned technical objects. Other technical objects that are not mentioned should be clearly understood by those having ordinary skill in the art through the following descriptions.

The present disclosure relates to a method, apparatus and system for allocating a moving object for a fleet system. The embodiments below may be commonly applied to a method, apparatus and system for allocating a moving object for a fleet system according to the present disclosure.

According to an aspect of the present disclosure, a method for allocating a moving object for a fleet system is provided. The fleet system has a fleet spot divided into a multiplicity of zones provided as accommodating space of a moving object. The method includes receiving, in a server, a use request of the moving object from a user device. The method also includes transmitting, in the server, an available moving object list including at least one zone and an available moving object of the zone in compliance with the use request to the user device. The method also includes receiving, in the server, reservation information based on a moving object that the user device selects in the available moving object list. The method also includes allocating the moving object to the user device based on the reservation information.

According to another embodiment of the present disclosure, a type, a detailed classification, and the number of moving objects allocated to the zone may be determined based on surrounding information of the zone including at least one of a facility located around the zone, a settled population, or a floating population.

According to yet another embodiment of the present disclosure, the use request is a message that is generated based on time to use a moving object. The use request may be a message that is generated by further including at least one of location information of the user, a type of the moving object, history information, preference information, or rating information.

According to yet another embodiment of the present disclosure, the location information of the user is the user's residence, the user's place of work, location information at time of use request, or location information at expected time of use. The available moving object list may present the available moving object in order from a nearest zone of a position of the location information to a further zone.

According to yet another embodiment of the present disclosure, the history information is propensity information of the user, which is analyzed based on a type of a moving object used by the user, a zone used by the user, a travel route, a destination point, and a parking spot during use. The preference information is a type of the moving object that is designated or estimated to be preferred by the user. The rating information may have a rating level that is given to the user based on use status information including subscription information for the fleet system and use performance information and after-use evaluation information of the moving object.

According to yet another embodiment of the present disclosure, the method may further include determining a benefit and a penalty for each user according to a rating level of the rating information. The available moving object list may be generated based on the benefit and penalty of rating information of the user.

According to yet another embodiment of the present disclosure, the benefit may include at least one of a specification, model year and cleanliness of the moving object, proximity between the zone presented by the available moving object list and the location information of the user, use of designated moving object, or use of designated parking lot.

According to yet another embodiment of the present disclosure, the method may further include: after the allocating of the moving object, when an abnormal situation occurs to the moving object in use, determining whether or not the abnormal situation occurs due to a user's poor use;

when a result of the determining is that the user's poor use is culpable, downgrading the user's rating level and applying a penalty to the user; and, when a result of the determining is that the user's poor use is not culpable, determining whether or not to apply a penalty to the user according to the user's rating level.

According to yet another embodiment of the present disclosure, when it is impossible to satisfy all the use requests of a multiplicity of user devices, the available moving object list may be generated differentially according to each of the users. Thus, as a user has a lower rating level, at least one of the zone or the available moving object is configured at a lower level than the use request based on rating information of users requesting the use requests.

According to yet another embodiment of the present disclosure, the use request is a message that is generated based on time to use a moving object. The use request may be a message that is generated by further including at least one of a user's life pattern information and riding pattern information of a moving object.

According to yet another embodiment of the present disclosure, the life pattern information may be generated based on at least one of the user's consumption information, a destination point of a moving object in use, or a waypoint of a moving object in use. The riding pattern information may be generated based on at least one of a zone and a parking lot of a moving object, the number of passengers of a moving object in use, the age and sex of a passenger, or body information of a passenger.

According to yet another embodiment of the present disclosure, the method may further include, after the allocating of the moving object, designating a zone for returning the moving object and a parking lot in the zone based on at least one of the life pattern information or the riding pattern information.

According to yet another embodiment of the present disclosure, the method may further include, after the designating of the parking lot, when another moving object enters the fleet spot for return before the moving object finishes being used, directing the return to a parking lot different from the designated parking lot.

According to yet another embodiment of the present disclosure, the method may further include, after the allocating of the moving object: receiving, in the server, current location information of the user device, when the use of the moving object starts within a predetermined time; transmitting, in the server, a route from the current location information to the fleet spot to the user device; and transmitting, in the server, a route from current location information in the fleet spot to a parking lot of the moving object to the user device, when the user device enters the fleet spot.

According to yet another embodiment of the present disclosure, the method may also include, after the transmitting of the route to the parking lot, sending a notification from the allocated moving object to a user may further be included, when the user device approaches the parking lot within a predetermined distance.

According to yet another embodiment of the present disclosure, the available moving object list is generated to include a moving object to be returned and a zone of return before a predetermined time of the time to use the moving object in the use request. Herein, when allocating by receiving reservation information based on the moving object to be returned, the method may further include: notifying the moving object to be returned to move to a zone that is different from the zone of return and is near the user location, when a distance between the zone of return of the moving object and the user location at the time to use the moving object exceeds a predetermined range; and approving return processing and subsequent use processing as a normal request, when handover of the moving object in the zone different from the zone of return is confirmed.

According to another aspect of the present disclosure, a server for a fleet system is provided. The fleet system has a fleet spot divided into a multiplicity of zones provided as accommodating space of a moving object. The server includes a transceiver configured to transmit and receive a signal and a processor configured to control the transceiver. Herein, the processor is further configured to receive a use request of the moving object from a user device. The processor is further configured to transmit an available moving object list including at least one zone and an available moving object of the zone in compliance with the use request to the user device. The processor is also configured to receive, reservation information based on a moving object that the user device selects in the available moving object list. The processor is further configured to allocate the moving object to the user device based on the reservation information.

According to yet another aspect of the present disclosure, a fleet system is provided. The fleet system has a fleet spot divided into a multiplicity of zones provided as accommodating space of a moving object. The fleet system includes a server configured to manage the fleet system; at least one user device registered to the fleet system and at least one moving object registered to the fleet system. Herein, the server is further configured to receive a use request of the moving object from a user device. The server is also configured to transmit an available moving object list including at least one zone and an available moving object of the zone in compliance with the use request to the user device. The server is further configured to receive reservation information based on a moving object that the user device selects in the available moving object list. The server is also configured to allocate the moving object to the user device based on the reservation information.

The features briefly summarized above with respect to the present disclosure are merely illustrative aspects of the detailed description below of the present disclosure and do not limit the scope of the present disclosure.

According to the present disclosure, a method and an apparatus may be provided for allocating efficiently a moving object to serve a user's purpose by using a fleet system that is implemented by a computing device.

The technical objects of the present disclosure are not limited to the above-mentioned technical objects. Other technical objects that are not mentioned should be clearly understood by those having ordinary skill in the art through the following descriptions.

BRIEF DESCRIPTION OF THE DRAWINGS

FIG. 8 is a view illustrating an example of rating information according to an embodiment of the present disclosure.

FIG. 9 is a view illustrating an example of benefit and penalty according to rating information according to an embodiment of the present disclosure.

DETAILED DESCRIPTION

Figure 1:
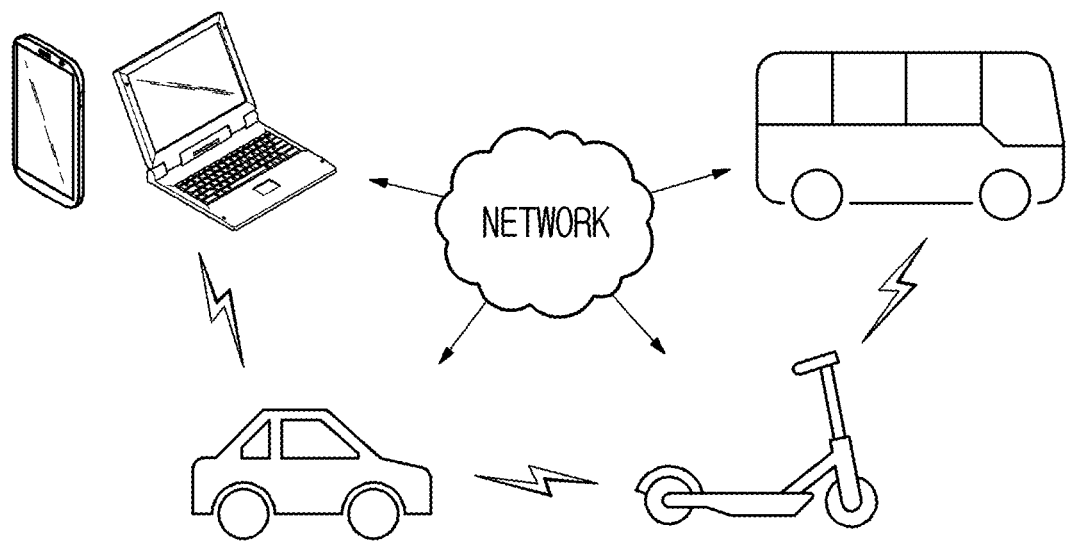
FIG. 1 is a view illustrating that a moving object communicates with another apparatus via a network.

Hereinafter, embodiments of the present disclosure are described in detail with reference to the accompanying drawings, which should be easily implemented by those having ordinary skill in the art. However, the present disclosure may be embodied in many different forms and is not limited to the embodiments described herein.

In the following description of the embodiments of the present disclosure, a detailed description of known functions and configurations incorporated herein have been omitted when it may make the subject matter of the present disclosure unclear. In addition, parts not related to the description of the present disclosure in the drawings have been omitted. Also, like parts are denoted by similar reference numerals throughout the description and drawings.

In the present disclosure, when a component is referred to as being "linked", "coupled", or "connected" to another component, it should be understood that not only a direct connection relationship but also an indirect connection relationship through an intermediate component may also be included. Also, when a component is referred to as "comprising" or "having" another component, it may mean that the component may further include another component rather than exclude another component, unless explicitly described to the contrary.

In the present disclosure, the terms first, second, etc. are used only for the purpose of distinguishing one component from another and do not limit the order or importance of components, etc. unless specifically stated otherwise. Thus, within the scope of this disclosure, a first component in one embodiment may be referred to as a second component in another embodiment and similarly a second component in one embodiment may be referred to as a first component.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components and some may be optional components. Accordingly, embodiments comprising or consisting of a subset of the components described in one embodiment are also included within the scope of the present disclosure. Also, embodiments that include other components in addition to the components described in the various embodiments are also included in the scope of the present disclosure.

Advantages and features of the present disclosure and methods for achieving them should be apparent with reference to the embodiments described below in detail with reference to the accompanying drawings. However, the present disclosure is not limited to the embodiments set forth herein and may be embodied in many different forms. The present embodiments are provided to make disclosed contents of the present disclosure thorough and complete and to completely convey the scope of the disclosure to those with ordinary skill in the art. When a component, device, element, or the like of the present disclosure is described as having a purpose or performing an operation, function, or the like, the component, device, or element should be considered herein as being "configured to" meet that purpose or to perform that operation or function.

FIG. 1 is a view illustrating that a moving object communicates with another apparatus via a network.

Referring to FIG. 1, a moving object may communicate with another moving object or another device. Herein, as an example, the moving object may communicate with another moving object or another device based on cellular communication, WAVE communication, dedicated short range communication (DSRC), or other communication schemes. In other words, as a cellular communication network, a communication network such as LTE, 5G, WiFi communication network, WAVE communication network, etc. may be used. In addition, a local area network used in a moving object, such as DSRC, may be used and the present disclosure is not limited to the above-described embodiment.

In addition, as an example, for the purpose of security of a moving object with respect to communication of the moving object, a module capable of communicating only with a device inside the moving object and a module capable of communicating with a device outside the moving object may exist separately. As an example, inside the moving object, communication based on the security such as Wi-Fi communication may be performed only for a device within a certain range in the moving object. As an example, the moving object and a personal device owned by the moving object driver may include a communication module for performing communication only with each other. In other words, the moving object and the personal device of the moving object driver may use a communication network disconnected from an external communication network. Also, as an example, the moving object may include a communication module for performing communication with an external device. In addition, as an example, the above-described module may be implemented as a single module. In other words, based on a single module, a moving object may communicate with another device, which is not limited to the above-described embodiment. In other words, in a moving object, communication may be performed based on various methods and is not limited to the above-described embodiment.

Herein, for example, a moving object may refer to a device capable of moving. As an example, a moving object may be a vehicle (including an autonomous vehicle or an automated vehicle), a drone, a personal mobility vehicle or device (i.e., hereinafter a "personal mobility"), a mobile office, a mobile hotel, or a personal air vehicle (PAV). "Personal mobility" may include a moving object including at least three wheels for stable independent driving or a moving object (e.g., a single-wheeled Segway, a two-wheeled Segway, an electric scooter, etc.) that has one or two wheels but is capable of being driven independently by keeping its balance. A personal mobility may use electricity as a power source by means of a battery but is not limited thereto and may utilize any type of power sources capable of moving the mobility. As an example, a personal mobility may mean a means of transportation that may be taken or used by only one user. In addition, a personal mobility may mean a means of transportation that a small number of users may use as a small means of transportation. As an example, not only a single-wheeled Segway, a two-wheeled Segway, and an electric scooter but also an electric wheelchair, an electric bicycle, and an electric two-wheeled vehicle may be a personal mobility. In addition, a moving object may be any other moving apparatus and is not limited to the above-described embodiment.

Figure 2:
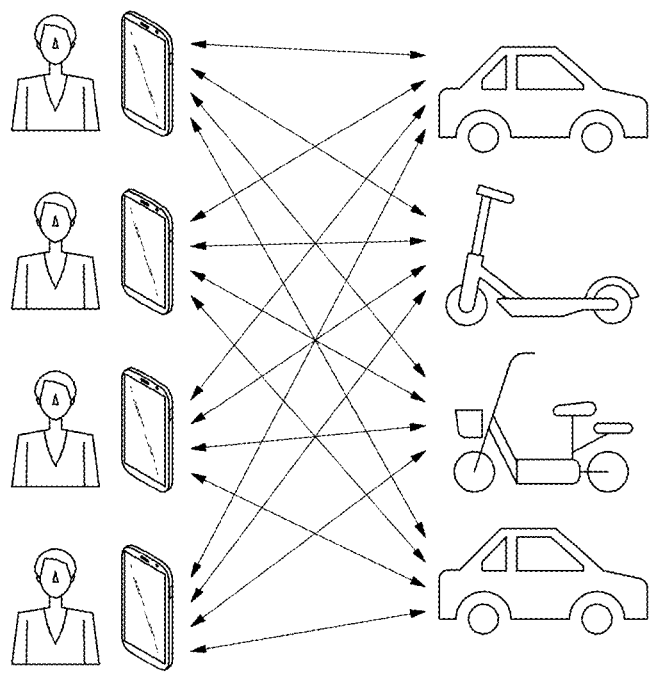
FIG. 2 is a view illustrating that a moving object is shared based on a fleet system.

FIG. 2 is a view illustrating that a moving object is shared based on a fleet system.

As an example, a fleet system may be applied to provide a moving object sharing service. Herein, the fleet system may be operated by data generation, processing, and exchange between computing devices. For example, a fleet system may be a system including at least one server, a multiplicity of user devices, and a multiplicity of moving objects. For a fleet service, a server may process a request of a user device, transmit a response message, and manage a moving object by processing the reservation and allocation/return of the moving object according to the request. Furthermore, the server may generate status information of every moving object by receiving moving object state information from moving objects so that overall information associated with moving objects may be managed. The server may implement a disposition process of a moving object, of which the disposition term is imminent or due, through mutual data exchange between a related user device and the moving object by using an application or program embedded in the server.

In addition, a fleet system may be a system including a multiplicity of devices and a multiplicity of moving objects. In addition, as an example, the fleet system may further include a road side unit (RSU). Herein, a device may be a smart phone, a smart pad, and a smart watch. As another example, a device may be an apparatus capable of performing other communication and exchanging a signal, which is not limited to the above-described embodiment. However, for the convenience of explanation, the terms "device" and "user device" are used in the description below. In addition, as an example, a moving object may be a vehicle. In addition, as an example, a moving object may be an object moving on rails or other constructed areas. As another example, a moving object may be a flying object such as a drone. In other words, a moving object may refer to an object capable of moving and may mean a shared moving object based on a fleet system. For the convenience of explanation, a moving object refers to a vehicle in the description below. This may be applied to other moving objects in the same way. As another example, a RSU may be a roadside apparatus capable of communication. In addition, as an example, a RSU may refer to a structure installed for transmitting and receiving a signal to and from a building or another area, which is not limited to the above-described embodiment. However, for the convenience of explanation, such structures are referred to as RSUs in the description below. RSUs may be various structures or apparatus, which is not limited to the above-described embodiment.

In addition, a fleet system may be a moving object sharing system. A fleet system may be a system in which a moving object is shared in a certain area. Herein, the certain area may be a local concept, such as an apartment complex, a workplace, and the like. As an example, the certain area may include an area in an apartment complex or an area a predetermined distance around the apartment complex. As another example, the certain area may mean an area a predetermined distance around the workplace. As another example, an area to which a fleet system is applied may be a larger area like an administrative district or a city, which is not limited to the above-described embodiment. In other words, the certain area may mean a reference range capable of operation based on a fleet system and may be changed by a user or a system. In addition, as an example, a fleet system may be a system in which a moving object is shared with a user authenticated as a specific user (or device). As an example, a specific user may be a resident of an apartment in a predetermined range of area or a worker of an office located in a particular region, in which a service of a fleet system may be provided. As an example, the specific user may be a subscriber to a fleet system available in a predetermined service area and be a user outside the service area. Such a user may be a person who wants to use a sharing service when approaching a predetermined service area. As an example, a fleet system may provide a moving object sharing service based on a device that an apartment inhabitant and/or an office worker has registered. Thus, a sharing service may be provided only to a specific person and the safety and management efficiency of a moving object may be enhanced. However, a specific user using a shared moving object in a fleet system may be determined based on a different method, which is not limited to the above-described embodiment. In a shared moving object fleet system, a shared moving object may be provided. Herein, a shared moving object may be a moving object authenticated and authorized to be shared by the system. As an example, the shared moving object may be a moving object registered in the fleet system. Here, a fleet system manager may provide a shared moving object for the fleet system. In other words, only a moving object authenticated or authorized by the fleet system manager may be used as a shared moving object. Thus, an accident that could occur due to the security or management of a moving object in a fleet system may be prevented beforehand. Specifically, a moving object to be shared may be registered in a fleet system. A right to register a moving object as a shared moving object in a fleet system may be restricted by the fleet system. Herein, a moving object capable of being registered in the fleet system may have a same ID or same identification information. In addition, as a fleet system provides a shared moving object, the management for the shared moving object may be performed. As an example, the management of a shared moving object may be necessary to provide a shared moving object service, such as residual oil information, moving object state information, or moving object driving information for the moving object registered in a fleet system.

Herein, the fleet system may check the state of a shared moving object in real time. For a moving object having a problem, the permission for use may be restricted or a command of repair may be delivered through the system, based on which a service may be provided.

As another example, a fleet system may provide a mixture of a shared moving object and a privately-owned moving object. As an example, the fleet system may set identification information, such as a moving object type indication field, to distinguish a shared moving object provided by the system and a privately-owned moving object. Herein, when the indication field is recorded as a value of not privately-owned moving object, it may indicate a shared moving object that is not privately owned but is provided by a system provider. On the other hand, when the indication field is recorded as a value indicating a privately-owned moving object, it may indicate there is a moving object privately owned and the moving object is provided as a shared moving object in a fleet system. It is also possible to consider a case in which a privately-owned moving object and a shared moving object provided by a system are mixed. Herein, as an example, the fleet system may provide different services based on a moving object type indication field. As an example, in the case of a moving object provided by the fleet system, there may be no restriction of use for a user who uses the moving object. On the other hand, in the case of a privately-owned moving object, there may be a restriction of use. As another example, in a fleet system moving object and a privately-owned moving object, a service may be provided based on different charging systems, which is not limited the above-described embodiment.

As another example, in relation to a specific operation of a fleet system, a service may be provided based on a device registered to the fleet system.

Specifically, the device registered to the fleet system may obtain information on a shared moving object after authentication and security procedures with the system. In other words, from the perspective of the device, information on the shared moving object may be provided. Herein, the device may contact the moving object to be used based on the information on the shared moving object.

As an example, there may be a moving object and a device (or users) that are registered to a fleet system. In other words, based on authentication and authorization, only specific moving objects and devices may be registered to the fleet system. Herein, the fleet system may be operated based on state information of the registered moving objects and the registered devices. As an example, the fleet system may check information on a moving object currently in use and location information on an individual moving object in real time. Herein, as an example, each moving object may periodically transmit its information to the fleet system. In addition, as an example, each moving object may transmit its information to the fleet system based on an event trigger. As an example, when an event of a change in location or in whether or not to use is triggered to a moving object, the moving object may transmit its information to the fleet system (or server). In addition, the fleet system (or server) may check information on a registered device in real time. Herein, as an example, the registered device may not always use a service of the fleet system. Accordingly, activation information indicating whether a registered device uses a service of a fleet system may be needed. Herein, as an example, the fleet system may include list information for a registered device. Among registered devices included in a list of a fleet system, a device, which is currently using a moving object or activates the system to use the moving object may be provided along with list information. As another example, devices may be indicated by being classified into registered devices (deactivated devices) that do not use a fleet system, registered devices (activated devices) that are using a moving object of the fleet system, and registered devices (temporary devices) that are willing to use a moving object. In other words, information may be provided as to whether or not devices are actually in use, whether or not there is an intention to use, and whether or not it is before use although there is an intention to use. In addition, as an example, for a device using a moving object of a fleet system, usage state information may further be indicated. As an example, usage state information may further include information on expected time of use or information on location of use.

Specifically, a fleet system may include list information on a multiplicity of moving objects and a multiplicity of devices that are registered. Herein, the list information may include at least one or more of usage state information, device location information, or moving object location information. Herein, the fleet system may provide a moving object sharing service based on the device location information and the moving object location information. In addition, the above-described usage state information may include at least one or more of information on a moving object in use, information on expected time of the moving object in use, device-moving object matching information, deactivated device information, activated device information, deactivated moving object information, and activated moving object information. Herein, as an example, the usage state information may further include information on a moving object in use that is being used by another device and information on expected time of the moving object in use. In addition, the usage state information may further include device-moving object matching information based on information in a list form. In addition, the usage state information may include activated device information and deactivated device information. As an example, as described above, the activated device may be a device that is preparing or prepared to use a current moving object among devices registered to a fleet system. As an example, the activated device may mean a device that executes a program or an application for the fleet system. Meanwhile, the deactivated device may be a device that is registered to the fleet system but does not use moving object sharing. As an example, the deactivated device may be a device that does not execute or deactivates a program or application for the fleet system.

In addition, a fleet system may include activated moving object information and deactivated moving object information. In this case, as an example, the fleet system may include state information on a multiplicity of moving objects. Herein, the state information on a moving object may be information about the moving object, such as, information on whether or not there is abnormality of the moving object, information on remaining distance to drive, or information on time of refueling. In other words, the state information on a moving object may be information for determining whether or not the moving object is capable of being provided for moving object sharing, which is not limited to the above-described embodiment. Herein, the fleet system may determine whether or not to activate the moving object based on the above-described state information. As an example, for a moving object with no abnormality and a sufficient amount of fuel, the fleet system may provide information on an activated moving object. On the other hand, the fleet system may classify a moving object with abnormality as a deactivated moving object. Herein, the fleet system may provide information on the deactivated moving object to an associated system or a server. As an example, the associated system or the server may perform repair or management for a deactivated moving object, which is not limited to the above-described embodiment.

In addition, as an example, a fleet system may classify a moving object with an amount of fuel below a predetermined level as a deactivated moving object, as described above. As another example, when a moving object with an amount of fuel below a predetermined level is shared through a device, the fleet system may provide a device user with information on the amount of fuel through notification. In addition, as an example, the fleet system may provide a user with information on a designated associated system (e.g., a gas station of a specific brand) and provide information indicating the necessity of refueling. Herein, the fleet system may exchange charging information or other necessary information with a designated associated system regardless of the user. Thus, a service may be provided.

In other words, a user using a moving object sharing system may refuel the moving object at a designated place without paying a fee. The fee may be processed through the fleet system and an associated system. Meanwhile, as an example, as described above, a device (temporary device) having an intention to use a moving object may want to use the moving object by checking a fleet system.

As an example, a moving object to be used may be allocated to a device through a fleet system. Herein, as an example, the fleet system or server may allocate the moving object to the device by using at least one of information on the moving object in use, location information of the moving object, or location information of the device. Meanwhile, as an example, when the fleet system cannot allocate any moving object, the fleet system may provide the device with information on the failure. In addition, as an example, the fleet system may allocate only a moving object within a predetermined distance from the location of the device, which is not limited to the above-described embodiment. Next, the device may access within the predetermined distance from the moving object. At this time, the device may transmit an authentication signal to the moving object. In addition, as an example, the device may use a shared moving object by tagging the shared moving object based on a list of available moving objects. As an example, the device may tag a moving object based on NFC, Bluetooth, or a magnetic means like a transportation card. Herein, when the device tags a shared moving object, an authentication procedure from the fleet system may be performed to provide the moving object to the device. As an example, when the authentication is completed based on the device tagging, the door of the moving object may be opened.

As for a detailed operation for authentication, when a device approaches a moving object within a predetermined distance, an authentication signal may be transmitted to the moving object. Herein, communication available to the moving object and the device may be Bluetooth, NFC or tag, as described above. In other words, a procedure for authentication may be performed under certain conditions, which is not limited to the above-described embodiment. When the device approaches or tags the moving object, the moving object and the device may exchange a signal so that whether or not the device may use the moving object is determined and the device is authenticated. Herein, the device may transmit, to the moving object, an authentication signal including its identification information and identification information of a group in which the device is included. Here, based on the received identification information of the device included in the authentication signal, the moving object may verify whether or not the device is registered to a fleet system. In addition, the moving object may determine whether or not the device is included in a group capable of receiving a service from the moving object based on the identification information of the group included in the authentication signal. In other words, the moving object may determine whether or not the device is capable of using the moving object based on the device identification information and the group identification information. As an example, when the device is incapable of using the moving object, the moving object may transmit information on unavailability to the device. As an example, the device may obtain the information on unavailability from an application or another service providing program.

Meanwhile, when the device is capable of using the moving object, the moving object may transmit a signal requesting the execution of an authentication procedure to the device. In other words, when the device is legally registered to the above-described fleet system (or server) and the moving object is capable of operating legally based on the fleet system, the moving object may transmit the signal requesting the execution of the authentication procedure to the device. Herein, the moving object may also transmit its identification information and encryption key information included in the signal requesting the execution of the authentication procedure. As an example, both the moving object identification information and the device information may be registered to the fleet system. In this case, the moving object may transmit a signal including the moving object identification information, the device identification information, and the encryption key information to the fleet system.

In addition, the device may also transmit a signal including identification information of a moving object, encryption key information, and its own identification information, which are included in a signal requesting the execution of an authentication procedure, to the fleet system.

Next, the fleet system may compare information included in the signal received from the moving object and information included in the signal received from the device. Herein, when the moving object identification information, the device identification information, and the encryption key information all agree or are all matched, the fleet system may recognize that the device is capable of using the moving object. Next, the fleet system may transmit authentication confirmation information to the moving object and the device. Herein, the fleet system may register, to a database, information indicating that the device uses the moving object. In addition, as an example, time for the device to use the moving object and additional information may be continuously transmitted.

In addition, the moving object may register the device based on the authentication confirmation information and may open the door of the moving object. In addition, a lock may be released to use the moving object and thus the device may control the moving object.

Herein, as an example, when the above-described authentication is completed, the moving object and the device may periodically exchange signals. In other words, while the device uses the moving object, the moving object may continuously confirm the use by periodically exchanging signals with the device.

Figure 3:
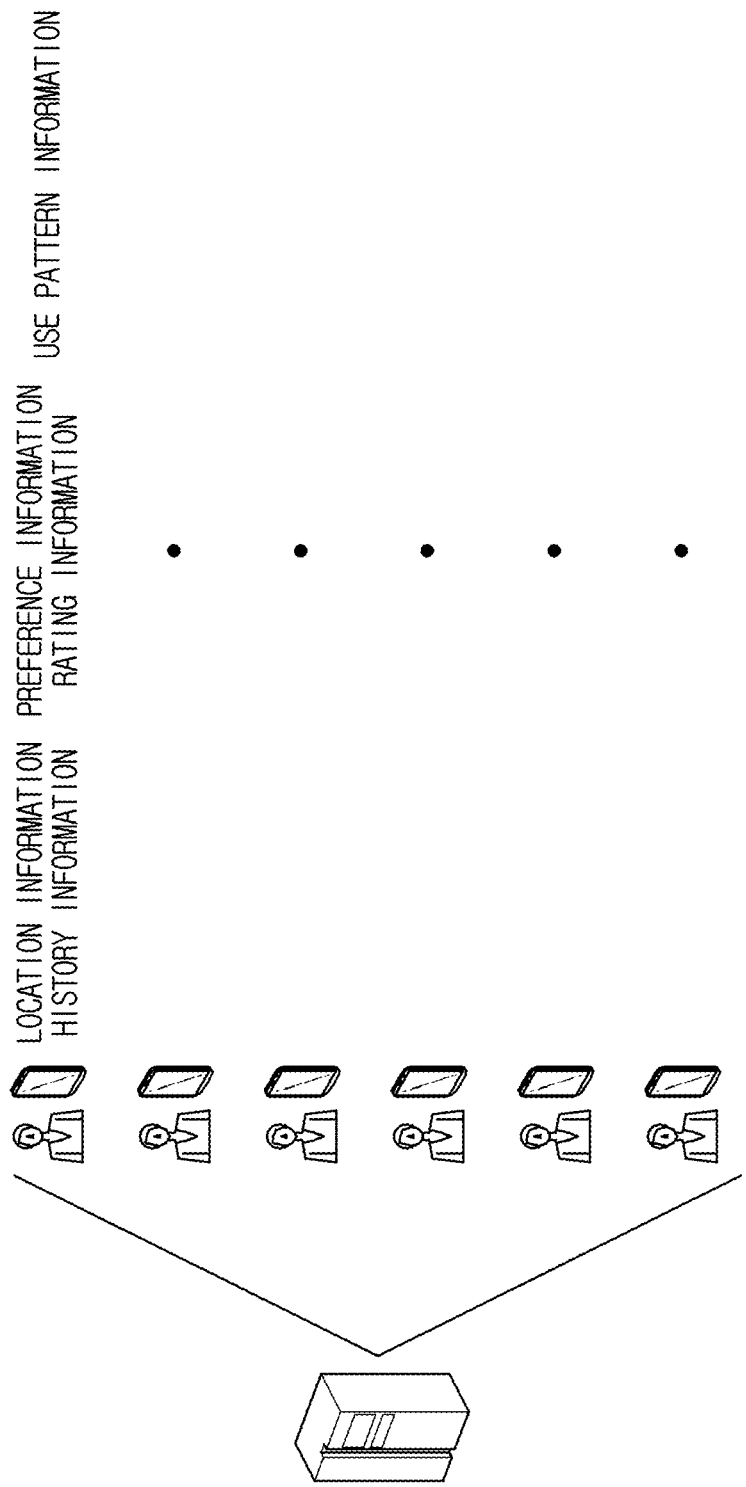
FIG. 3 is a view illustrating that a user is managed based on a fleet system.

FIG. 3 is a view illustrating that a user is managed based on a fleet system.

For example, based on the above description, a moving object and a device may be managed in a fleet system. Herein, as an example, information of each user may be managed in the fleet system. As an example, information of each user may be information on the user' use based on user identification ID or the user's identification device. As a more concrete example, information of each user may include at least one or more of information on the user's location, information on the user's history, information on the user's preference, information on use status, rating information, or use pattern information. As an example, information on the user's location may be information for identifying the user's main route while using a fleet system. As an example, a user's location information may be static location information set by the user, e.g. the user's residence and place of work, and dynamic location information, e.g. location information at time of use request and location information at expected time of use. In addition, as an example, a fleet system may store history information of a user. History information may be information on a user's propensity, which is analyzed based on a type of a moving object used by a user, a zone used in a fleet spot provided to a fleet system, a travel route, a destination point, and a parking point during use. As an example, a fleet system may perform recommendation for the use of a moving object based on a user's history information. In addition, as an example, a fleet system may perform management for allocating and distributing a moving object by using history information of a multiplicity of users. In addition, as an example, a fleet system may include information on a user's preference. As an example, information on a user's preference may be information considering the frequency or preference of a moving object in use. Specifically, preference information may be a type of the moving object that is designated or estimated by the user as a preferred moving object. In addition, as an example, a user's preference information may be information input by the user, which is not limited to the above-described embodiment.

In addition, as an example, a fleet system may provide rating information of a user. Rating information may be rating levels given to each user based on use state information including subscription information for a fleet system and use performance information and after-use evaluation information. As an example, subscription information may be information on whether or not a long-term contract is made as a contract condition for a service of a fleet system and whether or not premium membership is signed up. Use performance information may include a frequency with which a user uses a moving object, a fee according to time or distance, and the like. As an example, when a user frequently uses a moving object, the rating may be raised. In addition, in relation to evaluation information, a rating level may be lowered when a user smokes or causes bad smell in a moving object and when a subsequent user or a manager evaluates poor use or when such an evaluation may be accumulated. In addition, in relation to evaluation information, a rating level may be raised when a moving object is used without an accident or in a continuously good condition so that no unnecessary maintenance work is needed.

In addition, a fleet system may provide information on a user's use pattern. Use pattern information may be generated by collecting at least one of life pattern information and riding pattern information for each user. As an example, life pattern information may be generated based on at least one of a user's consumption information, a destination point of a moving object during past use, or a waypoint of the moving object during past use. Riding pattern information, for example, may be configured based on at least one of a zone and a parking lot, which are used by a moving object, an average number of passengers of the moving object, the age and sex of a passenger, or a passenger's body information. By considering use pattern information, a fleet system may determine at least one zone suitable for a user in a large area and may allocate a moving object placed in the zone. In addition, by analyzing use pattern information, a fleet system may determine a fleet spot for return and an optimal parking lot according to a user's use pattern and may notify the user when reserving a moving object.

In other words, a fleet system may match a moving object with a user based on various information related to the user. In addition, a fleet system may manage a user based on user-related information.

As an example, the above-described various information may be stored in a server controlling a fleet system and be managed. As another example, at least some of the above-described information may be installed in a moving object or be stored in an identification device capable of tagging or in a user device capable of communicating in a system and a moving object. When a moving object is allocated and used by a user, an identification device may be utilized to identify and authenticate whether or not the user is a user making a reservation. An identification device may transmit data for controlling a moving object, apart from for authentication, to the moving object and a fleet system (server). For example, by storing rating information of a user, an identification device may apply benefit information and penalty information (hereinafter, abbreviated as benefit and penalty respectively) according to a rating level of the user to the controller of a moving object. In addition, an identification device may detect a user's poor use through a sensor installed in a moving object, store evaluation information determined in real time, and transmit the information to a server. The server may update evaluation information. In addition, an identification device may collect life pattern information, e.g. the real-time travel path, destination point, and waypoint of a moving object in real time, and may transmit the information to a server so that the server may update life pattern information or change a zone of return or a parking lot that is designated at the time of reservation. In addition, an identification device may obtain riding pattern information different from at the time of reservation in real time and transmit the information to a server so that the server may update riding pattern information or change and control a zone of return and a parking lot, which were designated at the time of reservation.

Figure 4:
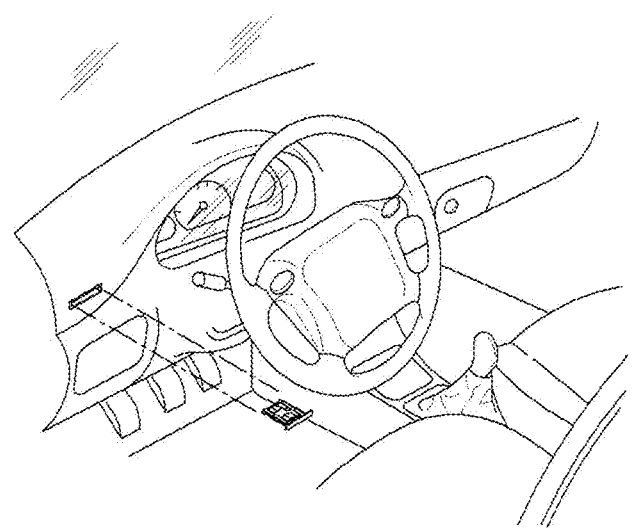
FIG. 4 is a view illustrating an example in which an identification device is applied to a moving object.

The shape of the above-described identification device is illustrated in FIG. 4. FIG. 4 is a view illustrating an example in which an identification device is applied to a moving object.

The identification device may be a device having at least any one or more functions of identifying a user, a control target, and a service target. In addition, as an example, the identification device may be a device having an ID function. In addition, the identification device may be at least any one or more of a smart device, a smart module, a user identification module, or an identification module. In other words, the identification device may be a hardware configuration. In addition, the identification device may be a software configuration used for the above-described identification. Herein, as an example, the identification device may be a subscriber identity module (SIM). As an example, a SIM, which is applied as an identification device to a moving object, may be at least one or more of a mobility SIM (M-SIM) or a vehicle SIM (V-SIM). In addition, as an example, the identification device may be a module that is the same as or compatible with an existing SIM, which is not limited to the above-described embodiment.

As described above, an identification device may be applied to a moving object by considering such a case in which the moving object performs communication with an external device. As an example, a user may be recognized through a universal subscriber identity module (USIM) in a user's smart phone and a service may be provided. Based on what is described above, a moving object may also have an integral identification device card. As an example, as an identification device applied to a moving object, a vehicle SIM may be referred to as V-SIM. In other words, as an identification device applied to a moving object, a new type of identification device may be applied. As an example, a V-SIM may be compatible with a USIM or another SIM. In addition, a V-SIM may provide another service by considering a characteristic of a moving object, which is not limited to the above-described embodiment.

FIG. 4 illustrates a part in a moving object, to which an identification device is applicable. Herein, FIG. 4 is merely an example to which an identification device is applied and the present disclosure is not limited to the above-described embodiment. Specifically, as shown in FIG. 4, a part for applying an identification device may exist in a position visually identifiable at the driver's seat of a moving object. Although not illustrated herein, as another example, an identification device may be applied inside the glove compartment of a passenger seat in a moving object. As another example, an identification device may be inserted into a part where a display of a moving object is present, which is not limited to the above-described embodiment and there may be a slot capable of holding an identification device in a suitable part inside and outside a moving object. As another example, in consideration of the portability of an identification device, the identification device may be embodied in a combined state with a tool key or a car key. In other words, an identification device may be installed in a tool key or a car key, and the identification device may be removed from the car key and be used by being installed in a moving object. A tool key or a car key may communicate with a moving object via a local area network (e.g., Bluetooth, Beacon, NFC) and thus perform message exchange and identification. In other words, a car key or a tool key reflecting the uniqueness of an individual may be used as an identification device, which is not limited to the above-described embodiment.

As another example, the identification device may be installed through an existing device, which is installed in a moving object. As an example, an existing device (e.g., toll payment terminal, black box) may be installed in a moving object. As another example, an identification device may be recognized through an existing terminal (e.g., USB port, cigar jack socket) included in a moving object.

As another example, an identification device may be applied to any position in a moving object within a range capable of authentication. The identification device may be applied either as an integrated form or a separate form to a control unit, a communication unit, or constitutional parts of the moving object.

Figure 5:
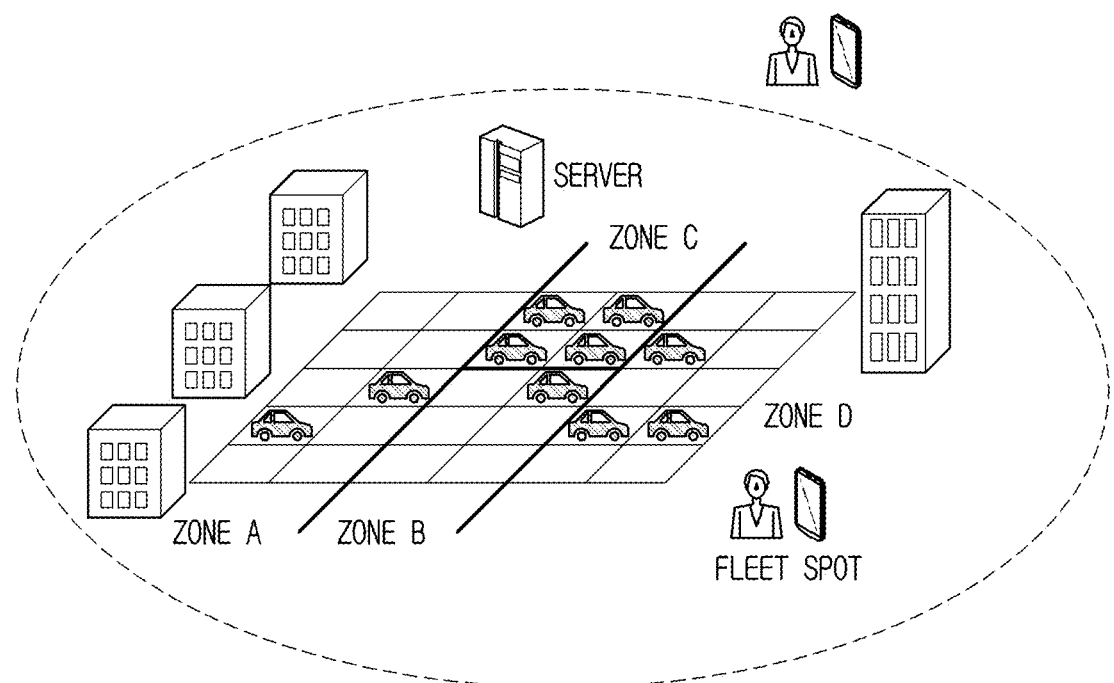
FIG. 5 is a view illustrating an example of a fleet spot according to an embodiment of the present disclosure.

FIG. 5 is a view illustrating an example of a fleet spot according to an embodiment of the present disclosure.

A fleet system may have and operate a fleet spot that is a space in which a shared moving object may be allocated and returned. A fleet spot may be a region in which a shared moving object is kept and a service is provided in a predetermined area. As an example, the predetermined area may be located as an area near a region dense with residential districts and/or commercial districts. This aims to enable a fleet system to enhance the convenience of a service for persons using buildings near residential and/or commercial buildings holding or accommodating many people or a large floating population. People who are likely to use a fleet system include not only inhabitants of buildings but also other people using the fleet system for various purposes, e.g. visiting a neighboring area of a fleet spot or transferring to another moving object via the fleet spot.

A fleet system according to the present embodiment may be operated by a small number of moving objects and be operated also by a large number of moving objects for expanding services and ensuring convenience through the fleet system. When being operated by a large number of moving objects, a fleet spot may have a large area of space for holding or accommodating various types of many moving objects. When a fleet spot is operated in a large area of space, a lot of moving objects may be deployed to be held uniformly across the large space and be deployed by considering a building around the fleet spot, the number of residents, a floating population, and the like. Accordingly, a fleet spot may be divided into a multiplicity of zones, as shown in FIG. 5, in order to efficiently manage many moving objects. A holding area and a parking lot may be allocated to a zone by considering information of the neighboring area of the zone, such as a building around a fleet spot, the number of residents, a floating population, and the like. For example, in the case of Zone A near an area dense with commercial buildings, by considering the number of residents of a building, the number of visitors, an expected purpose of a moving object (e.g., outside duty, delivery, non-occupational personal business, etc.), and average use state of a moving object (e.g., cleanliness, frequency of request of light maintenance, long travel, average number of passengers, etc.), small-sized sedans, medium-sized sedans, 7 to 11 seater vehicles, and personal mobilities may account for a large percentage of moving objects, while large-sized premium sedans may be allocated at a low percentage. In addition, among small and medium-sized vehicles allocated to Zone A, a larger number of vehicles may have intermediate and excellent levels in detailed aspects like age and cleanliness rather than top level while as for large-sized premium vehicles, excellent and top levels may account for a larger percentage. As another example, in the case of Zone D near a residential region, moving objects are used mainly for personal purposes like shopping, commuting, riding with family, and many other purposes belonging to personal lifestyles. Clean use and frequency of requesting light maintenance may be relatively better. Based on this, small to large-sized sedans and 7-to-11-seater vehicles may be uniformly allocated in Zone D and vehicles with excellent to top levels in age and cleanliness may be allocated to account for a relatively large percentage.

As another example, a maintenance or check-up zone may be allocated among zones of a fleet spot. For example, a fleet system may instruct a user of a moving object to return the moving object not to an original return zone but to a maintenance zone, when the moving object to be returned has no reservation for a predetermined time and the fleet system determines the need of check-up for the moving object or the need of urgent maintenance based on the state information of the moving object, even if there is a subsequent reservation. As another example, when a fleet system determines that a moving object having the need for a check-up is not in use and is parked in a non-maintenance zone, the fleet system may move the moving object to a predesignated zone in an unmanned or manned manner. Herein, the predesignated zone may be a place of maintaining and managing a moving object, such as a garage, a car wash, and a cleaning service for the interior of a moving object.

As another example, a fleet system may manage moving objects by grouping the moving objects in units of a predetermined number. In addition, the fleet system may perform maintenance and management for each group of moving objects. In the above-described example, when a maintenance zone is a garage, a car wash, and the like, a designated zone (a garage, a car wash, and a cleaning service for the interior of a moving object) for maintaining and managing moving objects may be set for each group of moving objects. In other words, when the maintenance and management for a moving object is necessary, a fleet system may move the moving object to a designated zone of each group in a manned or unmanned manner. Thus, the moving object may be enabled to be maintained and managed. As the maintenance and management for moving objects is performed in each group of moving objects, as many moving objects as possible may be maintained and managed in a limited time.

As another example, a fleet system may enable quick maintenance and management when a moving object has a check-up time by placing a support unit for maintaining and managing moving objects in each group of moving objects. As an example, the support unit may be a maintenance vehicle placed for maintaining and managing moving objects.

As an example, a fleet system may be operated so that a central server manages moving object state information related to the allocation/return state, location and use state of a moving object, and re-allocation of a zone of a moving object for a multiplicity of zones and processes each type of the user information described above. As another example, a fleet system may be operated in a distributed way so that a slave system for each zone is allocated to process and manage a task related to the moving object and a central master server accepts a user's use request and manages a task until the allocation of a moving object in a specific zone and various information of each user. A master server may receive a processing result of a task related to a moving object and update information of each user. Hereinafter, for the convenience of explanation, a central server is described to process a moving object and information of each user and to manage every zone, but it is not excluded that such processing may be performed in a master server and a slave system.

In principle, a fleet system is operated to rent a moving object in a fleet spot and to return the moving object to a corresponding zone and may also be flexibly operated to return the moving object to another zone different from the corresponding zone according to rating information of each user and use pattern information. In addition, a fleet system may permit return to a different type of fleet system by considering a type of premium service used by a user, a temporary request, and rating information.

FIG. 5 illustrates that zones are allocated next to each other on the ground surface. However, according to the distribution of neighboring buildings and populations, the zones may be separated from each other within a distance range in which a user may easily move by walk or by means of a personal mobility for a short range. As another example, zones may be set as a multiplicity of zones for each floor of multi-story buildings and facilities in order to enhance the availability of ground surface.

Hereinafter, it is described that a fleet system implemented by a computing device allocates a moving object.

A fleet system has an embedded application or program for allocating a moving object. For the convenience of explanation, such applications and programs are collectively referred to as applications. An application may implement a moving object allocation process based on requests and data mutually transmitted among a user device, a shared moving object, and a server. Such an application may be embedded in a user device, a shared moving object, and a server so that the server may implement the process by obtaining information generated from each computing device. For the convenience of explanation, it is mainly described that a server executes the process. However, for example, in order to secure a storage space of a server memory, data generated by using a moving object may be accumulated in a user device and/or the moving object and the data accumulated until the time of request may be transmitted to the server at the request of the server.

Figure 6:
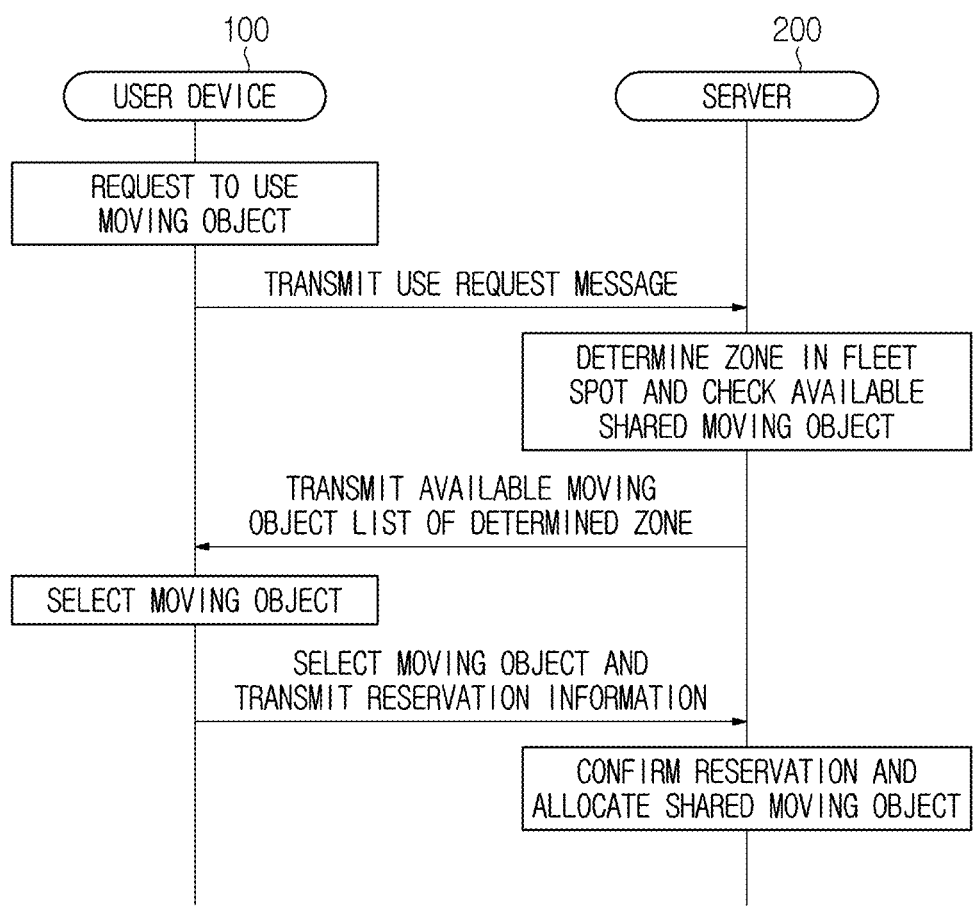
FIG. 6 is a flowchart illustrating a method for allocating a moving object for a fleet system according to an embodiment of the present disclosure.

FIG. 6 is a flowchart illustrating a method for allocating a moving object for a fleet system according to an embodiment of the present disclosure.

First, a user device 100 may make a request to use a moving object to a server 200 of a fleet system. As the use request includes at least time to use a moving object, the use request transmitted to the server 200 may be a message that is generated based on the time to use a moving object. As an example, a use request message may be generated by further including a user's location information together with time to use a moving object. As an example, a user's location information may be a residence or a place of work, which the user has registered. In addition, a user's location information may be location information at the time of making a use request, as confirmed by a user device, or location information input as a location in which the user is expected reach when using a moving object. For example, when a residence or a work of place is set as location information either basically or later, the location information may be determined. As another example, when location information at the time of use request other than a residence or a work of place is selected and is input, the location information may be set as a selected location.

A use request may be a message including, apart from time to use a moving object, at least one of a type of the moving object, history information, preference information, or rating information. A type of moving object may be a type of a moving object selected by a user device at the time of request and a detailed classification. The type may be sedan-type vehicles with small to large sizes, sport utility vehicle (SUVs), 7-to-11-seater vehicles, vehicles for transporting loads, and personal mobilities. A detailed classification may be a brand, a specific model, model year, cleanliness, maintenance condition, etc. As history information, preference information, rating information, and use pattern information have been described above, further descriptions have been omitted. The user device 100 may set in advance whether or not to include the above-described information through an application and a program that are provided by a fleet system. When set in advance, a use request may be a message based on time to use a moving object and information set in a user device, excluding a user's location information. Even when setting in advance, the user device may further set or demand at the time of request that a use request message is to be generated by including location information along with the above-described setting information and time of use. In this case, the use request message is generated by including every information described above and may also be generated based on the requested location information in preference to the user's estimated location information inferred by setting information.

Next, the fleet system (or server) 200 may determine at least one zone meeting a use request and may check an available moving object list including an available moving object of the zone.

When a use request is a message that is generated by time to use a moving object and a user's location information, the server may check a moving object available at the time of use in each zone by referring to scheduling of use of moving objects. The server 200 may sort moving objects sequentially from a nearest zone to gradually farther zones and then to a farthest zone according to the user's location information among zones in which available moving objects are confirmed. The sorting of moving objects may be set up to a predetermined number of moving objects.

As another example, a use request including time to use a moving object may be a message that is generated as a combination of location information and other information or as other information without location information. For example, when location information is not included and other information is at least one of history information or preference information, the server 200 may search use scheduling for a moving object suitable for a moving object type identified in history information and/or preference information and a past/preferred zone of a fleet spot. The server 200 may select an available moving object corresponding to the type in the searched zone. Herein, when there is no moving object corresponding to a preferred type and the zone used at the time of use, the server 200 may match a moving object equivalent with the preferred type in a zone adjacent to the preferred zone. In addition, when history information further includes at least one of a user's travel route, a destination point, or a parking lot during use, the server 200 may generate history information by weighting a travel route, a destination point, and a parking lot, which have occurred more frequently than once. By using the generated history information, the server 200 may analyze a user's purpose of using a moving object, for example, whether or not the user has a personal purpose, e.g. a long drive, a business trip, shopping, or a visit to house. For example, when an analysis result based on history information is a business trip with a long drive, the server may check relatively recent sedan-type moving objects with middle or low rating and low mileage in every zone. In addition, the server 200 may further consider a moving object type and a zone used in the past. In this case, a zone and a moving object meeting the type and the zone used in the past may be selected among moving objects checked based on a purpose of use. Meanwhile, when the server 200 determines a zone as a use request is generated as a message including a user's location information along with history information and/or preference information, the user's location information may be set to be preferred zones in the history information and/or the preference information. Thus, among moving objects checked in history information and the like, the server 200 may select available moving objects from a nearest zone to farther zones and then to a farthest zone according to a location of the user's location information.

As another example, other information of a use request may be rating information. A use request may be a message that is generated as a combination of a user's location information and rating information or rating information without location information, together with time to use a moving object. The server 200 may check a benefit and a penalty, which are given to a user making a use request according to a rating level of rating information. The server 200 may further determine a condition for allocating a moving object based on the checked benefit and penalty. For example, the server 200 may determine an available moving object and a zone of the moving object, which meet an allocation condition including the type, specification, model year, and cleanliness of a moving object and an allocated zone. As a concrete example, when a user requests a latest sedan with premium specification as a detailed option of a use request, although the user has rating information of a low rating level permitting no premium sedan and not considering allocation of a neighboring zone, the server 200 may not consider the detailed option of the user. Specifically, the server 200 may check available moving objects from sedans with specifications lower than premium level. When the user's use request overlaps with a use request of another user with higher rating than the user, the server 200 may determine a moving object of a zone that is not adjacent to the user's location information.

As another example, other information of a use request may be use pattern information. A use request including time to use a moving object may be a message that is generated as a combination of a user's location information and use pattern information or as use pattern information without location information.

As described above, use pattern information may be generated by collecting at least one of life pattern information or riding pattern information for each user.

Use pattern information may be set by a user before or at the time of use request and may be included in a message of use request. In addition, use pattern information may be inferred based on driving location information of a moving object, which is obtained according to a user's agreement, the user's data of purchase/trade of goods and services during time of use, and boarding information recognizable from communication. The communication may be performed via an image acquisition device installed in a moving object, an ultra-wide band (UWB), a beacon, Bluetooth, Wi-Fi, or identification devices installed in the user device 100 of every driver/passenger and the moving object. For example, driving location information may be a place as a waypoint of a user using a moving object, a destination, parking and stopping places, and the like, which may be a shopping mall, a hospital, and a specific building as the destination of business trip. Purchase/trade data may be a list of goods and services that a user purchases and consumes while using a moving object. The goods may be purchased in a shopping mall, a market, an outlet, and a clothing shop. The services may be medical services and cultural services, e.g. film and theater.

Life pattern information may be determined based on a list of goods/services that occur with high frequency in recent time of using moving objects. For example, when payment information frequently occurs recently in a large hospital, an orthopedist's office, and other hospitals related to special diseases, life pattern information may be set by applying a weight to a medical service rather than other items with reference to the recent payment information. In addition, the use pattern information of a specific user may be determined by considering driving location information, which is confirmed by a recent frequent destination, e.g. a hospital, and riding information, e.g. old people riding mainly in time of use related to visit to hospitals. Of course, as driving location information, purchase/trade data, and riding information are information that vary over time, information on a multiplicity of locations, a list of purchased items, and passengers, which are included in use pattern information, may be configured in a ranking order by applying a higher weight to the above-described information obtained through a user's time of recent use than past information.

When a use request is a message including life pattern information, the server 200 may determine an allocation condition of a moving object according to the life pattern information for a user making the use request. For example, after searching for a waypoint and a destination, which a user making a use request has frequently visited in recent days, purchase/trade data and the like, the server 200 may find that the user has spent much money and purchased a lot of goods in a specific shopping mall and the shopping mall is included as an expected shopping location of the use request. In this case, the server 200 may determine an available moving object satisfying an allocation condition meeting life pattern information, such as a type of moving object, a specification, an age, and cleanliness, and a zone of the moving object. As in the example described above, when life pattern information indicates that a user making a use request purchases a lot of goods in a shopping mall, the server 200 may select an available moving object that is a SUV type capable of loading a lot of goods, is not a latest model but manufactured 3 or 4 years ago, and has an intermediate to low level of cleanliness. As a fleet system allocates a moving object so that an allocation zone and a return zone are as identical as possible, the server 200 may select and present the moving object from a nearest zone to a user's residence. Thus, as the user returns the moving object to the return zone near the residence, the user may be able to bring a lot of goods purchased by the user to the residence by taking a short distance.

As another example, after browsing use pattern information of a user making a use request, the server 200 may determine that a middle-aged driver recently takes an elderly passenger to visit a specific hospital on a regular basis and there is payment information for hospital services, if time to use a moving object is requested to actually match a period of visiting the hospital. In this case, the server 200 may determine a moving object, which satisfies an allocation condition meeting the use pattern information, and a zone of the moving object. In the example described above, the server 200 may select an available moving object of sedan type with medium or larger size, which provides comfort for a multiplicity of passengers, is a newest model year or has a latest age, and has an excellent or higher level of cleanliness. For the convenience of use for an elderly passenger, the server may select and present the moving object from a nearest zone as possible to a user's residence.

Next, the server 200 may receive reservation information based on a moving object that is selected in an available moving object list by the user device 100.

As described above, in the case of a use request composed only of time of use, an available moving object list may be presented as a list of moving objects in an adequate zone according to use scheduling of a moving object. As another example, when a use request is a message that includes, along with time of use, at least one of a user's location information, a type of moving object, history information, preference information, rating information, the user's life pattern information, or riding pattern information of a moving object, an available moving object list may be presented by combining a multiplicity of moving object, which are selected by referring to the message, and zones of the moving objects.

Reservation information may include an identification number (e.g., license plate number) of a moving object selected from a list, time of use, and a parking lot.

Next, the server 200 may allocate a moving object to the user device 100 based on reservation information.

When a user uses an actual moving object, the user may move to a parking lot of a zone, which is set in reservation information, and may receive a moving object. As another example, when a user enters a zone of a fleet spot far from a parking lot for a personal reason, the server 200 may move a moving object with autonomous driving function to the user's waiting location according to an adjacent delivery request of the user device 100. The waiting location may be identified based on location information of the user device 100. When a moving object has no function of autonomous driving, the server 200 may move the user to a parking lot using a separate transportation means (e.g., unmanned shuttle operating in a fleet spot) according to an adjacent delivery request.

Figure 7:
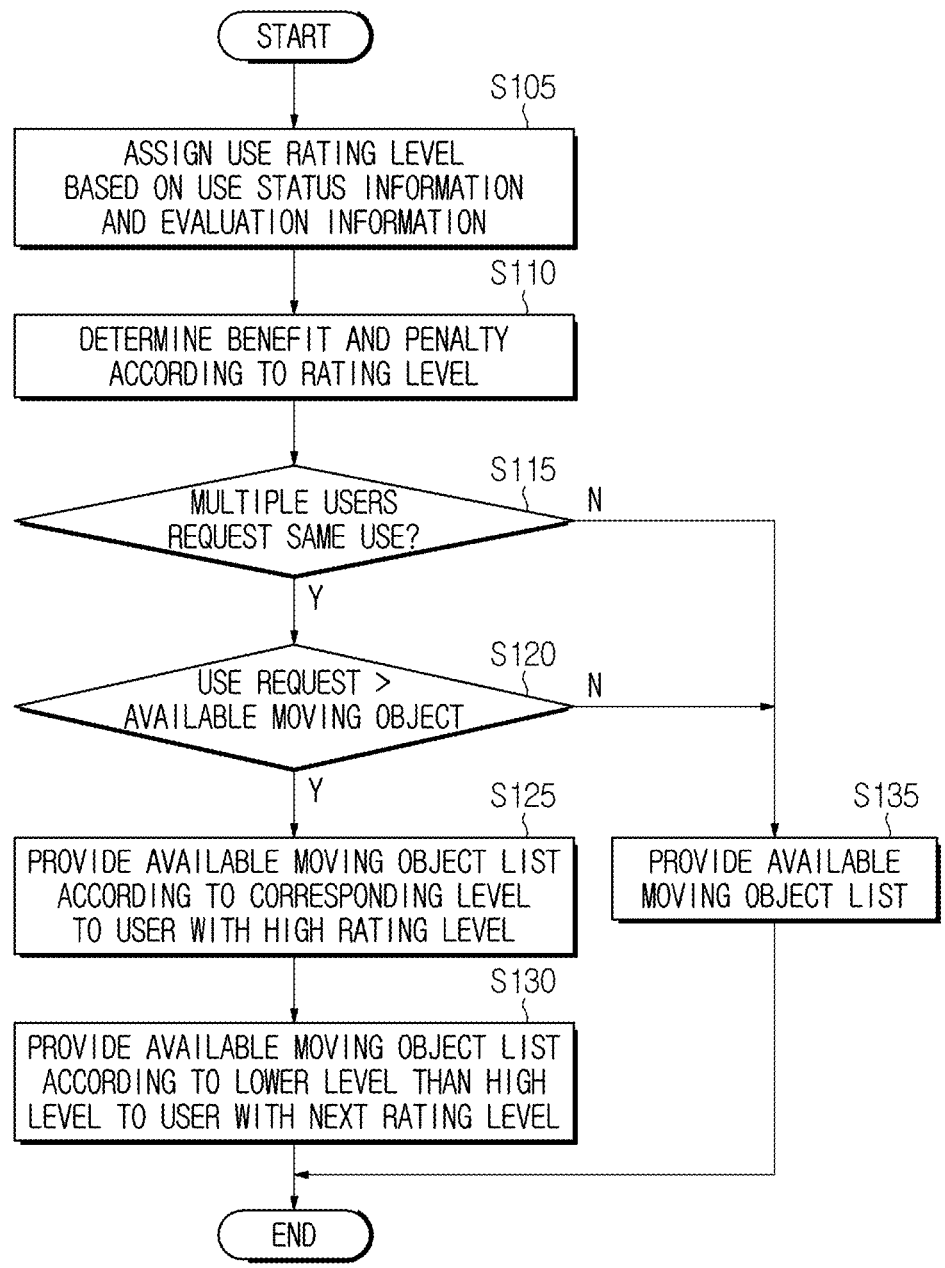
FIG. 7 is a flowchart illustrating a method for allocating a moving object at use requests of a multiplicity of users according to an embodiment of the present disclosure.

FIG. 7 is a flowchart illustrating a method for allocating a moving object at use requests of a multiplicity of users according to an embodiment of the present disclosure.

First, the server 200 may assign a user rating level to each user based on the user's use status information and evaluation information that is accumulated whenever using a shared moving object (S105). As also described in FIG. 4, use status information, which is a factor for assigning rating information, e.g. a rating level, may include subscription information and use performance information.

FIG. 8 is a view illustrating an example of rating information according to an embodiment of the present disclosure. At the time of an initial or renewed contract, use status information may consider a term of contract, e.g. a short term, a midterm, and a long term, or may consider use performance of a moving object irrespective of the term of contract. Evaluation information may be generated based on cleanliness after use of a moving object, occurrence of maintenance due to an accident and an improper use of the moving object, and a drastic increase in the degree of wear for components of the moving object due to a user's poor use, e.g. sudden stop/speeding. Evaluation information may be produced or estimated by a subsequent user or a maintenance center after the return of a moving object or from the above-described elements sensed by various sensors during/after use, which are installed in the moving object. A determined rating level may be a discrete rating according to zones, as in FIG. 8 or be assigned as a concrete score. Meanwhile, a user with low level may improve evaluation through continuous fine use or may raise his rating level through payment of upgrading fee.

Next, the server 200 may determine a benefit and a penalty according to rating levels (S110).

As an example, as shown in FIG. 9, the server 200 may determine a policy according to rating levels and the policy may change according to a user's use pattern, a condition of a moving object, and requests of a user and an operator.

FIG. 9 is a view illustrating an example of benefit and penalty according to rating information according to an embodiment of the present disclosure. As shown in FIG. 9, the server 200 may allocate moving objects in a whole range from top-class to low-class specifications to a user with top rating level of S. For example, when there is a use request in which a user designates only time of use, the server 200 may set a moving object with a predetermined rating from a top-class specification to be included in an available moving object list among available moving objects at the time of use. When there is no best specification at time of use, it may be determined that moving objects rated next best top-class and middle-class specifications are to be included in the available moving object list. In addition, when there is a use request in which a user corresponding to the rating level of S designates only time of use, the server 200 may present a moving object satisfying as many benefit conditions as possible in terms of age, cleanliness, and allocation zone, which are illustrated in FIG. 9, among moving objects with good-class specifications. As indicated by the term "recommended" described in FIG. 9, it is checked whether or not there is a highest rating corresponding to each rating level in each benefit condition. When there is such a highest rating, a moving object corresponding to a benefit of highest rating may be included in a list. When such a highest rating does not exist, subsequent search is performed for a next highest rating of benefit. A benefit may be related to a direct condition of a moving object, e.g. function, model year, cleanliness, and the like, and may be an additional service for the convenience of a fleet service. Additional services may also be differentiated according to rating levels. For example, when a use request with S-A rating levels overlaps with a user with lower rating level located in a same zone, the server 200 may recommend a moving object of a neighboring zone to a user with S-A rating levels in preference to the user with lower rating level. Furthermore, a user with high rating level may designate and use a moving object, which is frequently used based on history information and preference information, as a long-term vehicle and may designate a parking lot convenient to the user, as necessary. In addition, a moving object and a parking lot, which are frequently used, may be determined by additionally considering history information, live pattern information, and riding pattern information. The server 200 may assign a right to use the moving object determined based on the above-described information as a long-term moving object to a user with high rating level or may provide a right to use the parking lot identified based on the above-described information.

In addition, the server 200 may limit some of benefits enjoyable at a current rating level by imposing a penalty for a user's poor use and may lower the rating level when the poor use is accumulated. As described in FIG. 8, rating levels may be lowered due to degradation of cleanliness of a moving object, occurrence of maintenance caused by a user's poor use, an increase in the degree of wear caused by the user's severe use, and the like. However, when the server 200 determines a user's poor use, if a degree of idleness, such as a time and expense of maintenance work for a moving object, which are caused by the occurrence of maintenance, is equal to or lower than a predetermined value, the application of a penalty may vary according to rating levels. In addition, when cleanliness degradation and a degree of wear of components are below a reference value, the application of a penalty may vary according to rating levels. In other words, in case of a user's slightly poor use, as shown in FIG. 9, the server 200 may apply a penalty according to rating levels. As another example, when poor use of a moving object occurs due to a user's mistake, a penalty may be set to be applied irrespective of rating levels.

Referring to FIG. 7 again, it is possible to determine whether or not use requests of a multiplicity of users are identical or similar (S115). Based on the information of FIG. 3 or each user's additional request message related to a moving object, which are included use requests with at least some overlapping time of use, the server 200 may determine whether or not a multiplicity of users make a same or similar request.

For example, from each user's use request generated based on at least one of location information, history information, preference information, or use pattern information, the server 200 may determine whether or not each user's use request has the same or similar (in other words, some of the allocation request information) allocation request information with respect to desired zone, moving object type, parking lot, and cleanliness. As another example, when at least one piece of allocation request information lacks time of use and thus not all use requests can be satisfied, the server 200 may change the piece to information closer to allocation request information in a corresponding zone. In this case, by using close information, the server 200 may determine whether or not each user's use request is identical.

As an analysis result of a use request, when an available moving object list to be presented to a multiplicity of users includes a same type of available moving objects with a same zone, type, and cleanliness, the server 200 may determine whether or not the number of moving objects according to a multiplicity of use requests is larger than the number of available moving objects (S120).

When it is determined that the number of moving objects according to a multiplicity of use requests is larger than the number of available moving objects, the server 200 may provide an available moving object list, which corresponds to a level illustrated in FIG. 9, to a user with a highest rating level among a multiplicity of users, according to the above-described benefit policy of rating levels (S125). For example, an available moving object list may be presented so as to include a request of a user with a highest rating level, which is inferred from location information, preference information, and use pattern information, i.e., a desired type of moving object allocated in a specific zone. For example, when it is assumed that a user visits a medical facility with an elderly passenger on a predetermined cycle, a specific zone and a moving object may include a top-class vehicle with latest model that is allocated in a neighboring zone of the user's residence.

As described above, when a user with high rating level is given an available moving object corresponding to the level, the server 200 may exclude the available moving object provided to a list of the user with high rating level and provide a user with next highest rating level with an available moving object list corresponding to or lower than the next highest rating level (S130).

For example, a top-class vehicle with latest model allocated in a zone near a user with next highest rating level, which is inferred from a use request of the user, may be excluded from an available moving object list and a differentiated list from a list of a user with high rating level may be provided.

Meanwhile, in the steps S115 and S120, when the conditions are not satisfied (i.e. "N" of S115 and S120), the server 200 may equally present a list including a moving object satisfying a zone according to each user's use request, a moving object type, and cleanliness (S135). As another example, when using a specific type of moving object with good cleanliness is prohibited according to a policy because a specific user has a low rating level, the server 200 may present a list excluding the moving object to the user.

The description above has illustrated benefits according to levels by focusing on neighboring zones. As another example, when there are a sufficient number of available moving objects of a same type in a same zone, the server 200 may write an available moving object list to make a user with highest level have benefits of high ratings in preference to a user with second highest level with respect to various benefits listed above, such as specification, model year, cleanliness, and parking lot.

The present embodiment has described that a multiplicity of use requests are actually received at the same time, but the present disclosure is not limited thereto. Even when a user with a low level receives confirmation of reservation before a user with high level does through a use request, the server 200 may ask the user with the low level to change the information of reservation, which precedes the reservation of the user with the high level, within a predetermined range of time according to a policy. In this case, the server 200 may present an available moving object excluding a specific moving object, which is selected also by the user with the high level, to the user with the low level in accordance with the embodiment of FIG. 7.

Figure 10:
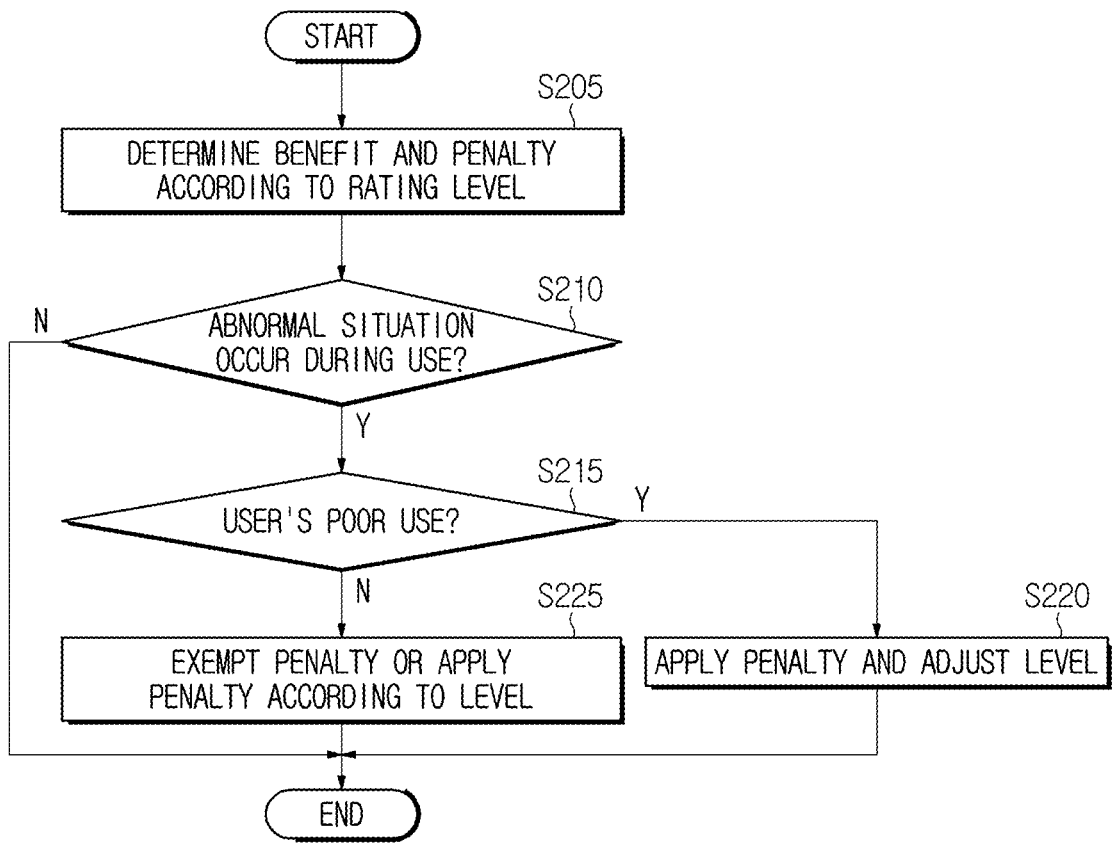
FIG. 10 is a flowchart illustrating a method for providing benefit and penalty in case an abnormal situation occurs to a moving object in use.

FIG. 10 is a flowchart illustrating a method for providing benefit and penalty in case an abnormal situation occurs to a moving object in use.

As shown in FIG. 10, the server 200 may determine a benefit and a penalty according to rating levels (S205) and a user may possess a benefit and a penalty corresponding to his rating level. A similar step has been described in detail with reference to FIG. 7 and thus a detailed description of S205 has been omitted herein.

Next, the moving object and/or server 200 may check whether or not an abnormal situation occurs to a moving object while a user is using the moving object (S210).

As an example, the abnormal situation is detected by the moving object and a detected result may be transmitted to the server 200 and be analyzed. The abnormal situation may be an accident of the moving object, poor cleanliness, and a drastic increase in the degree of wear of components, which may be detected by a camera, a shock sensor, a smell sensor, and a sensor for abnormality of components, which are installed in the moving object.

For example, as for poor cleanliness, a user's smoking may be detected based on a temporary change of odor component caused by smoke, video capture of the user's smoking, and the like. In addition, when a user's behavior makes a seat or mat damaged by dirt or damages the interior of a vehicle, this may be detected by a camera, an order sensor, and the like.

In the above-described example, an abnormal situation may be recognized during the operation of a moving object. As another example, an abnormal situation may be inferred through check-up, maintenance, and a subsequent user's evaluation, which are performed after the return of a moving object.

Check-up may be performed through visual inspection of a manager stationed in a fleet spot or by means of an automatic scanner connected to a device for processing unattended return. The automatic scanner may have a space, which a moving object may pass through, and an image acquisition device capable of capturing the exterior and interior of the moving object around the moving object. By utilizing an analysis according to machine learning, the server 200 may analyze a passenger's behavior and whether or not there is a damage to a specific part of the moving object from an image obtained from the image acquisition device or the camera.

When an abnormality of a component occurs during the use of the moving object, the moving object to be returned may move to a maintenance zone of a fleet spot and information related to component damage and a degree of wear, which are identified by maintenance, may be delivered to the server 200.

When receiving the returned moving object, a user may evaluate the non-visible condition of the moving object, such as the smells of cigarettes or odor and the noise of the moving object, by responding to a questionnaire or a feedback window on the user device 100. In addition, a subsequent user may let the server 200 check whether or not there is an abnormal situation by capturing the visible condition of the moving object through the user device 100.

Next, the server may determine whether or not an abnormal situation is caused by a user's poor use (S215).

For example, the server 200 may check whether or not an accident of the moving object is caused by another person's mistake using another moving object. The server 200 may estimate a degree of culpability of another user through an image of the accident obtained by a camera of the moving object. The server 200 may determine the user's poor use based on the degree of culpability. As another example, the server 200 may determine a user's poor use by considering an image of a passenger smoking a cigarette, recognition of the odor of cigarette smoke, and follow-up evaluation for an unpleasant smell like a cigarette. In order to determine whether or not drastic wear of a component, which has been identified by a sensor, check-up or maintenance, is caused by a user's poor or severe use, the user's driving information may be utilized, such as speeding, sudden stops, quick starts, and excessive use of driving and power systems, may be utilized. When a value quantized from the user's driving information is equal to or less than a reference value, the server 200 may determine that the user does not poorly use the moving object, even when the wear of a component occurs. As another example, concerning whether or not a user has made the interior of a moving object dirty, the server 200 may determine whether or not the user used the moving object excessively poorly through a captured image, a check-up, and a follow-up evaluation. For example, when a degree of dirtiness is equal to or less than a predetermined reference value or an image shows that food has made the interior of a moving object dirty by an unexpected external factor, the server 200 may determine that the poor cleanliness is not caused by a user's poor use.

In case a user's poor use is the cause (Y of S215), the server 200 may apply the above-described penalty to the user of a moving object, irrespective of a rating level, and may adjust the user's rating level when an accumulation of penalties reaches a lowering condition (S220).

In case the user's poor use is not the cause (N of S215), the server may determine according to the rating level whether or not to apply a penalty to the user of the moving object and may apply the penalty accordingly (S225). For example, even when a user with the rating level of S uses a moving object in a slightly poor way, the server 200 may not evaluate the user with the rating level of S as a poor user but may exempt the user from a corresponding penalty. On the other hand, a user with the rating level of C may have a penalty due to the occurrence of an abnormal situation, irrespective of the user's poor use. The user with the rating level of C may pay a predetermined amount of money to be exempt from the penalty.

Figure 11:
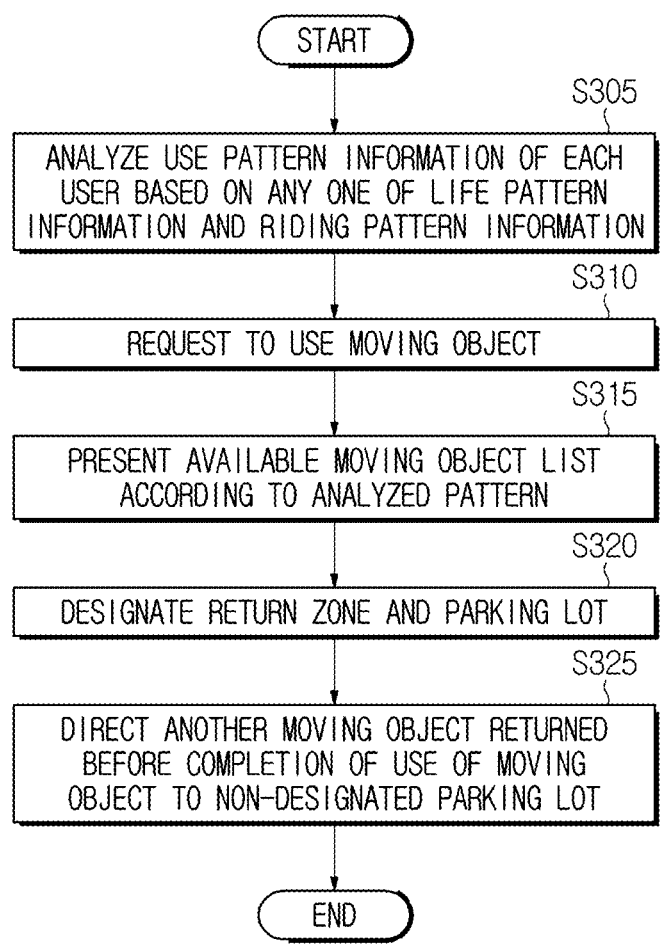
FIG. 11 is a flowchart illustrating a method for allocating a moving object based on use pattern information according to an embodiment of the present disclosure.

FIG. 11 is a flowchart illustrating a method for allocating a moving object based on use pattern information according to an embodiment of the present disclosure.

First, the server 200 may analyze use pattern information of each user according to at least one of life pattern information or riding pattern information (S305). Life pattern information and riding pattern information may be inferred based on at least one of driving location information, purchase/trade data, or riding information. The information mentioned herein is actually the same as what is described above and thus a detailed description has been omitted.

Next, a user may generate a use request of a moving object, which includes a message designating time of use, by utilizing the user device 100 and may transmit the use request to the server 200 (S310).

The use request may include allocation request information including the moving object type, cleanliness, and parking lot of a specific zone meeting at least one of life pattern information or riding pattern information.

Next, according to an analysis of use pattern information, the server 200 may present the user device 100 with an available moving object list including an available moving object satisfying life pattern information and riding pattern information and a zone to which the moving object belongs (S315).

When a use request is a message including life pattern information, the server 200 may determine an allocation condition of a moving object according to the life pattern information for a user making the use request. For example, after searching for a waypoint and a destination, which a user making a use request has frequently visited in recent days, purchase/trade data, and the like, the server 200 may find that the user has spent much money and purchased a lot of goods in a specific shopping mall and the shopping mall is included as an expected shopping location of the use request. In this case, the server 200 may determine an available moving object satisfying an allocation condition meeting life pattern information, such as a type of moving object, a specification, an age, and cleanliness, and a zone of the moving object. As in the example described above, when life pattern information indicates that a user making a use request purchases a lot of goods in a shopping mall, the server 200 may generate an available moving object list including an available moving object that is a SUV type capable of loading a lot of goods, is not a latest model but manufactured 3 or 4 years ago, and has an intermediate to low level of cleanliness.

In addition, the server 200 may select and present the moving object from a nearest zone as possible to a user's residence. Thus, as the user returns the moving object to the return zone near the residence, the user may be able to bring a lot of goods purchased by the user to the residence by taking a short distance.

As another example, after browsing the life pattern information and riding pattern information of a user making a use request, the server 200 may determine that a middle-aged driver recently takes an elderly passenger to visit a specific hospital on a regular basis and there is payment information for hospital services, if time to use a moving object is requested to actually match a period of visiting the hospital. In this case, the server 200 may generate an available moving object list including a moving object, which satisfies an allocation condition meeting the above-described pattern information, and a zone of the moving object. In the example described above, the server 200 may write an available moving object list to include an available moving object of a sedan type with a medium or larger size, which provides comfort for a multiplicity of passengers, has a latest age or recent model year, and has an excellent or higher level of cleanliness. For the convenience of use for an elderly passenger, the server 200 may select and present the moving object from a nearest zone as possible to a user's residence.

Next, the server 200 may recommend and provide a return zone and a parking lot of the return zone, which are convenient to a user after completing the use of the moving object, based on at least one of life pattern information or riding pattern information (S320).

The server 200 may confirm a return zone and a return parking lot by using information on parking and stopping locations included in a user's use pattern information and history information. An identification device installed in a moving object or a user device may collect a user's past information of parking and stopping locations. When there is a specific purpose (e.g., shopping, business trip to a specific region) or a specific passenger, the server 200 may recognize that the user repeatedly returns a moving object to a parking lot within a predetermined range in a specific zone. As another example, the server 200 may recognize that a user prefers several parking lots in a specific zone for the purpose of commuting. As another example, the server 200 may receive, through an additional request message of a use request, a request that a user will park repeatedly in a specific parking lot to visit many facilities near a fleet spot or is going to use a parking lot adjacent to a next destination. Meanwhile, a return parking lot may be recognized by an image acquisition device installed in a moving object. An image acquisition device may obtain an image related to a uniform identification means (e.g., uniform number, uniform mark, and the like) given to a parking lot of a fleet spot or a landmark near a parking lot and a line of the parking lot. A moving object and/or the server 200 may identify a return parking lot, in which a user parks, through an image of a uniform identification means and a landmark/line combination. The moving object and/or the server 200 may further obtain information on the return parking lot.

In the above example, a return zone and a return parking lot are designated based on use pattern information. However, as another example, a return zone and a parking lot may be designated by adding a user's rating information.

When the server 200 does not consider a user's rating information, a return parking lot with a high frequency may be identified from use pattern information and be recommended. However, when many users return moving objects to only a few parking lots in a specific zone, return space needs to be distributed. Accordingly, the server 200 may recommend users' return parking lots by differentiating the parking lots according to the benefits and penalties of rating levels presented in FIG. 9.

Next, before the use of a moving object is completed, when another moving object enters a fleet spot for the purpose of return, the server 200 may guide the return to a parking lot different from a designated parking lot (S325).

Figure 12:
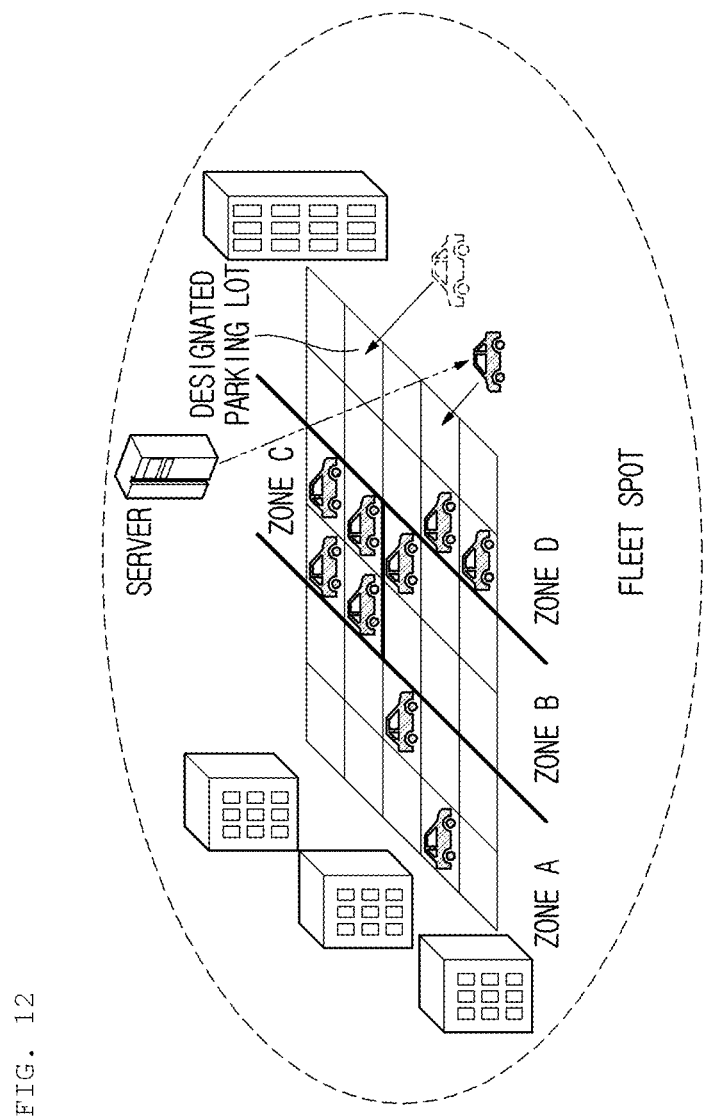
FIG. 12 is a view illustrating an example of directing another moving object to a parking lot different from a designated parking lot.

This may be illustrated by FIG. 12, which is a view illustrating an example of directing another moving object to a parking lot different from a designated parking lot.

The moving object indicated by dotted lines is a moving object that receives a designated return parking lot from the server 200 and is to be returned to the designated return parking lot after being completely used. The moving object in dotted lines is a moving object to which a return parking lot is allocated based on use pattern information and rating information. Moving objects indicated by solid lines are examples of vehicles to which no specific return parking lot is allocated. When the moving object shown in dotted lines are still in use and has not been returned and a moving object shown in solid line is returned to a fleet spot near the end of time of use, the server 200 may check whether or not the moving object shown in solid lines approaches toward the designated parking lot. The server 200 may check whether or not the moving object shown in solid lines approaches by a camera installed in the fleet spot, by deceleration of the moving object near the designated parking lot, by images of the surrounding area obtained from a camera installed in the moving object, and the like.

When the moving object shown in solid lines enters a predetermined range of distance from the designated parking lot, the server 200 may notify the moving object that the moving object should be returned to a parking lot other than the designated parking lot. The server 200 may notify simply information on the designated parking lot or further instruct that the moving object should be returned to a specific parking lot.

In the above embodiment, when a moving object shown in solid lines approaches near a designated parking lot, return to another parking lot is notified. However, as another example, the above-described notification may be given immediately before or immediately after the entry into a fleet spot.

Figure 13:
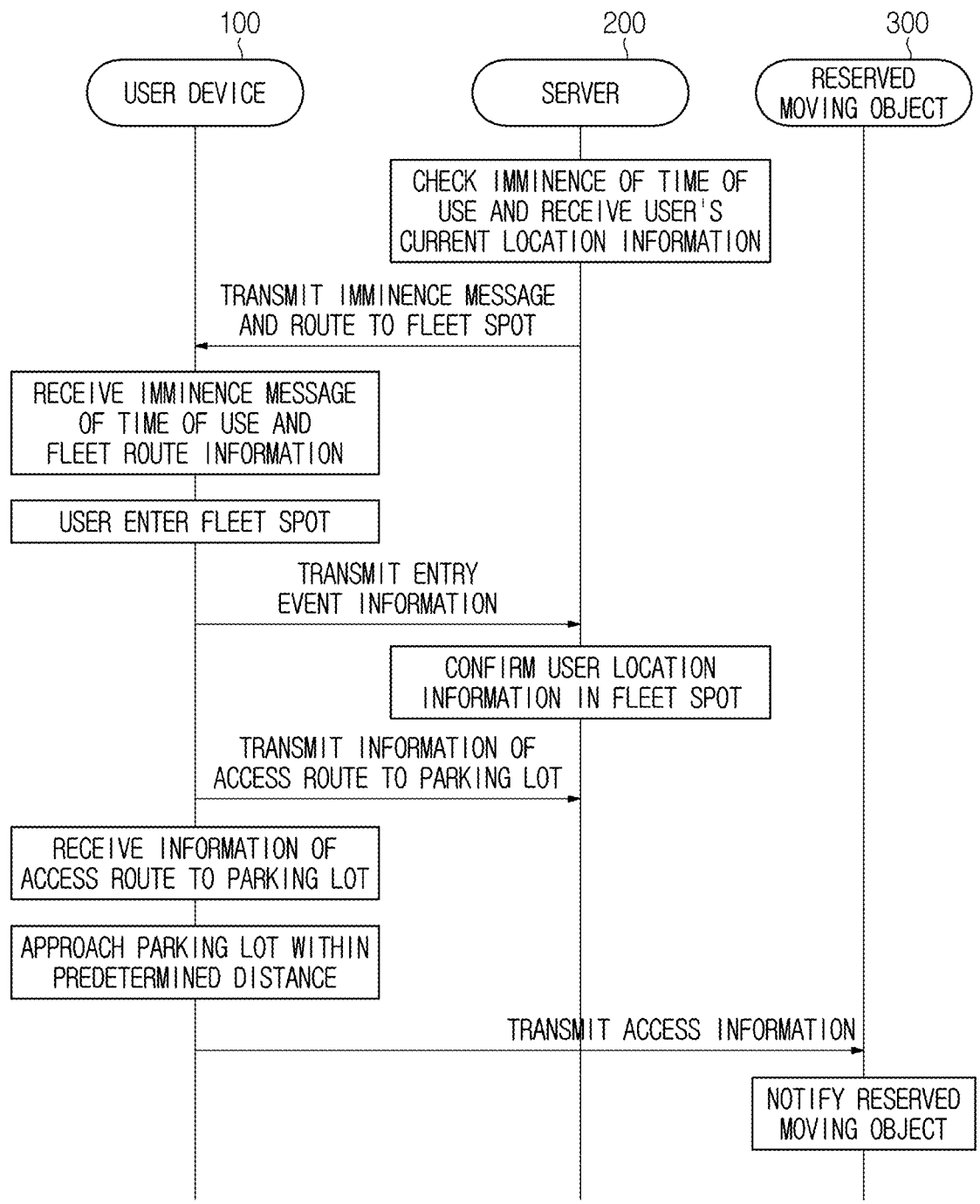
FIG. 13 is a flowchart illustrating a method for guiding a zone and a parking lot of a moving object according to an embodiment of the present disclosure.

FIG. 13 is a flowchart illustrating a method for showing a zone and a parking lot of a moving object according to an embodiment of the present disclosure.

First, when time of use of a reserved moving object 300 is imminent, the server 200 may receive current location information of the user device 100.

The user device 100 may include a transceiver that performs transmission and reception with a base station by means of a location sensor and a predetermined communication protocol. The current location information of the user device 100 may be obtained from a physical address that is estimated from a base station communicating with a location sensor, e.g. GPS sensor and/or a transceiver. When the use of the moving object 300 starts within a predetermined time, the server 200 may receive current location information obtained via a network.

Next, the server 200 may transmit a route from current location information to a fleet spot and a message of imminence to the user device 100. The user device 100 may receive the message of imminence and the route.

For example, the server 200 may provide a route from a current location to a fleet spot through a map that a fleet system or an external commercial application provides to the user device 100. In addition, along with the route, the server 200 may further provide information on a transportation means to arrive at the fleet spot.

Next, when the user device 100 enters the fleet spot, the server 200 may receive entry event information and confirm a user's location information in the fleet spot through the user device 100.

For example, the user device 100 may confirm the user's location information in communication with a local area communication device installed in the fleet spot, for example, a device implemented by beacon, DSRC, WIFI, and the like. Thus, when the user device 100 enters the fleet spot, a module of the user device 100 communicating with the device may be activated and be capable of communicating with the device.

Thus, as there may occur a case in which a user making a reservation does not use the reserved moving object 300 in some situations, the server 200 may obtain the user's location information, when the user enters a fleet spot, and may provide information on access route to a parking lot described above.

Next, the server 200 may transmit, to the user device 100, an access route from location information in the fleet spot to a parking lot of the reserved moving object 300, and the user device 100 may receive information on the access route to the parking lot. For example, the server 200 may possess a parking lot map of the fleet spot and transmit a parking lot map showing an access route to a parking lot.

In addition, when there is a means of transportation like an unmanned shuttle for carrying users within a fleet spot, the server 200 may ask the user device 100 whether or not to call such an unmanned shuttle, along with an access route to a parking lot. When the user device 100 wants to call a shuttle, an unmanned shuttle may move to the user's location in the fleet spot and carry the user to the parking lot.

When the reserved moving object 300 detects the user's access within a predetermined distance from the parking lot through the user device 100, the reserved moving object 300 may provide a notice for easy identification to the user. The notice may be implemented by a visual method, e.g. flickering headlight, an acoustic method like the operation of a car horn, and a tactile method, e.g. vibration of the user device 100.

Figure 14:
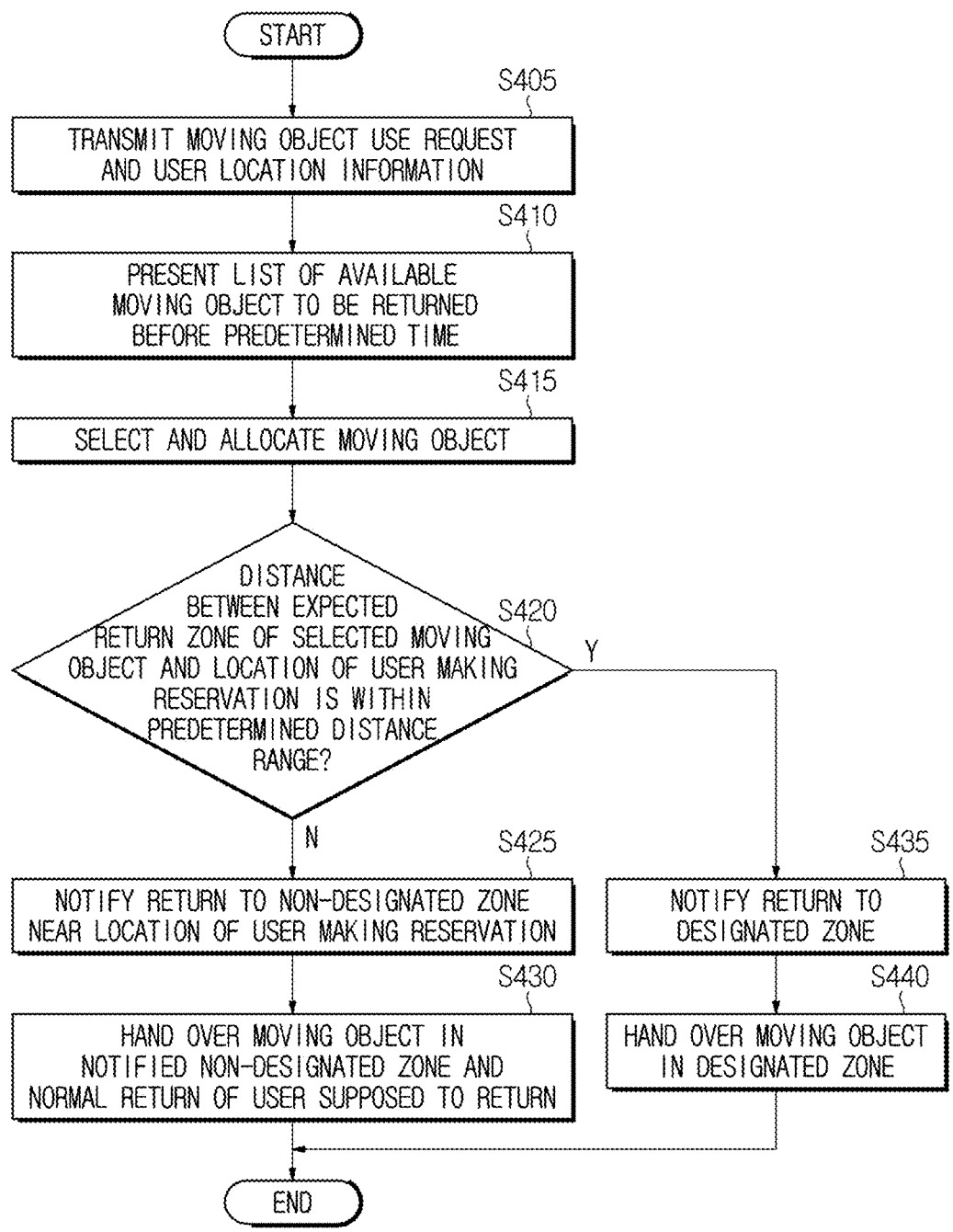
FIG. 14 is a flowchart illustrating a method for taking over a moving object in a non-designated zone according to an embodiment of the present disclosure.

FIG. 14 is a flowchart illustrating a method for taking over a moving object in a non-designated zone according to an embodiment of the present disclosure.

A moving object use request of the user device 100 and a user's location information may be transmitted to the server 200 (S405). The use request may include only time of use or may include the information listed through FIG. 3 along with time of use. The user's location information may be transmitted to the server 200 in real time in such a way as communication with a location sensor of the user device and a base station, which have been described through FIG. 13, and communication with a local area communication device. The user's location information may be transmitted to the server 200 until the moving object is handed over.

Next, the server 200 may generate an available moving object list, including a moving object, which is to be returned before a predetermined time or an expected time of use of a moving object in the use request, and a return zone. The server 200 may further provide the list to the user device 100 (S410).

The predetermined time may be a waiting time permitted between when a user makes a reservation and when a user is supposed to return the moving object, in consideration of the return of the moving object and the reception of the moving object by the user making the reservation. Expected time of use may come later than the return time. As another example, expected time of use may come earlier than the return time. Since, in either case, one of the users has to wait, the server 200 may employ a maximum waiting time, which is analyzed by considering a case in which both users meet face-to-face for handover, as the predetermined time.

According to the procedure described in FIG. 6, FIG. 7, and FIG. 11, an available moving object list may additionally include a moving object, which meets a use request and is going to be returned, or a moving object that is supposed to be returned near expected time of use, for the convenience of handover or for prompt use immediately after reservation. In the user device 100, an available moving object list indicates separately a moving object to be returned so that the user may easily select the moving object.

Next, the user may select a moving object in the available moving object list by using the user device 100 and then the moving object may be allocated to the user (S415).

Next, when the expected time of use is imminent, the server 200 may obtain the current location information of the user making a reservation and may check whether or not a distance between a return zone of the selected moving object and the user's location is within a predetermined range (S420).

When the distance exceeds the range, the server 200 may notify that the user, who is supposed to return the moving object (i.e., the current user), is to return the moving object to a non-designated zone near the location of the user making a reservation, who is present in a specific zone near or inside the fleet spot (S425). At the same time, the server 200 may transmit a message to the effect that the moving object may be handed over in the zone to the device of the user making a reservation, while guiding the non-designated zone set by the server 200.

Next, the server 200 may verify that the user, who was supposed to return the moving object, has normally returned the moving object in the non-designated zone and may also permit the normal handover of the moving object to the user making a reservation (S430).

On the other hand, when the distance does not exceed the range, the server 200 may notify to the user that is supposed to return the moving object that the moving object should be returned to the originally designated return zone (S435). Such a notice may also inform the user that is supposed to return the moving object that there is a reservation of a subsequent user. In addition, the server 200 may transmit a message to the effect that the moving object can be handed over in the designated zone indicated at the time of reserving the moving object to the device 100 of the user making the reservation.

Next, immediately after the user that is supposed to return the moving object returns the moving object in the designated return zone, the user making the reservation may receive and use the moving object (S440).

Figure 15:
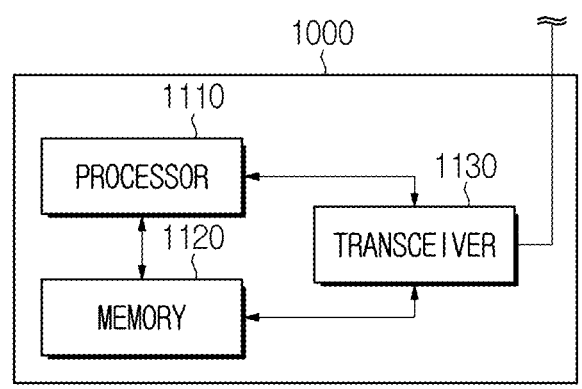
FIG. 15 is a view illustrating an apparatus configuration according to an embodiment of the present disclosure.

Meanwhile, FIG. 15 is a view illustrating an apparatus configuration according to an embodiment of the present disclosure. Referring to FIG. 15, an apparatus may include at least one or more of the above-described moving object, a device, a server, or a RSU. In other words, the apparatus may communicate and work with another device, which is not limited to the above-described embodiment. As an example, for the above-described operation, an apparatus 1000 may include one or more among a processor 1110, a memory 1120, and a transceiver 1130. In other words, the apparatus may include a necessary configuration for communicating with another apparatus. In addition, as an example, the apparatus may include other configurations than the above-described configuration. In other words, the apparatus may have a configuration, which includes the above-described apparatus for communicating with another device but is not limited thereto. The apparatus may be an apparatus operating based on what is described above.

Although the methods of the present disclosure described above are represented by a series of acts for clarity of explanation, they are not intended to limit the order in which the steps are performed. If necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the disclosure are not intended to be all-inclusive and are intended to illustrate representative aspects of the disclosure. The features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. A method for allocating a moving object for a fleet system having a fleet spot divided into a multiplicity of zones provided as accommodating space of a moving object, the method comprising:

registering, by a server configured to manage the fleet system, moving objects to be shared in the fleet system;

communicating, by the server, with the moving objects to periodically receive state information of the moving objects in real time;

allocating, by the server, each moving object to use and to be placed in a zone of the multiplicity of zones by considering environment information of a neighboring area of each zone, based on a type of the moving object and the state information of the moving object;

receiving, by the server, a use request of the moving object from a user device;

receiving, by the server, a real-time user location of the user device from a location sensor of the user device until the moving object is handed over;

configuring, by the server, riding pattern information of the moving object based on the zone used by the moving object;

updating, by the server, the riding pattern information of the moving object in response to the riding pattern information of the moving object obtained by the user device in real time;

generating, by the server, an available moving object list comprising i) a moving object satisfying the updated riding pattern information of the moving object, ii) the zone used by the moving object; and iii) at least one zone in compliance with the use request and an available moving object of the at least one zone in compliance with the use request, wherein the use request includes the real-time user location of the user device;

transmitting, by the server, the available moving object list to the user device;

receiving, by the server, reservation information based on a moving object that the user device selects in the available moving object list;

allocating, by the server, the moving object to the user device based on the reservation information; and moving, by the server, the moving object with autonomous driving function to the real-time user location of the user device, wherein the available moving object list is generated to further comprise a moving object to be returned and a zone of return before a predetermined time of the time to use the moving object in the use request, and wherein, when allocating the moving object by receiving reservation information based on the moving object to be returned, the method further comprises instructing the moving object to be returned to move to a non-designated zone that is different from the zone of return and is near the real-time user location of the user device, when a distance between the zone of return of the moving object and the real-time user location of the user device at the time to use the moving object exceeds a predetermined range, and approving return processing and subsequent use processing as a normal request, when handover of the moving object in the non-designated zone different from the zone of return is confirmed.

2. The method of claim 1, wherein a type, a detailed classification, and a number of moving objects allocated to use the zones are determined based on surrounding information of the zones comprising at least one of a facility located around the zones, a settled population, or a floating population.

3. The method of claim 1, wherein the use request is a message that is generated based on time to use a moving object, and
wherein the use request is a message that is generated by further comprising at least one of location information of a user, a type of the moving object, history information, preference information, or rating information.

4. The method of claim 3, wherein the location information of the user is the user's residence, the user's place of work, location information at time of use request, or location information at expected time of use, and
wherein the available moving object list presents the available moving object in order from a nearest zone of a position of the location information to a further zone.

5. The method of claim 3, wherein the history information is propensity information of the user, which is analyzed based on a type of a moving object used by the user, a zone used by the user, a travel route, a destination point, and a parking spot during use,
wherein the preference information is a type of the moving object that is designated or estimated to be preferred by the user, and
wherein the rating information has a rating level that is given to the user based on use status information comprising subscription information for the fleet system and use performance information and after-use evaluation information of the moving object.

6. The method of claim 3, further comprising determining a benefit and a penalty for each user according to a rating level of the rating information,
wherein the available moving object list is generated further based on the benefit and penalty of rating information of the user.

7. The method of claim 6, wherein the benefit comprises at least one of a specification, model year and cleanliness of the moving object, proximity between a zone presented by the available moving object list and location information of the user, use of a designated moving object, or use of a designated parking lot.

8. The method of claim 6, further comprising:
after the allocating of the moving object,
determining whether or not an abnormal situation occurs due to a user's poor use, when the abnormal situation occurs to the moving object in use;
lowering a rating level of the user and applying a penalty to the user, when the determining concludes that the abnormal situation occurs due to the user's poor use; and
determining whether or not to apply a penalty to the user according to the rating level of the user, when the determining concludes that the abnormal situation does not occur due to the user's poor use.

9. The method of claim 3, wherein, when it is impossible to satisfy all use requests of a multiplicity of user devices, the available moving object list is generated differentially according to each of the users so that, as the user has a lower rating level, at least one of the zone used by the available moving object or the available moving object is configured at a lower level than a corresponding use request based on rating information of users requesting the use requests.

10. The method of claim 1, wherein the use request is a message that is generated based on time to use a moving object, and
wherein the use request is a message that is generated by further comprising at least one of a user's life pattern information or riding pattern information of a moving object.

11. The method of claim 10, wherein the life pattern information is generated based on at least one of the user's consumption information, a destination point during use of a moving object, or a waypoint during use of a moving object, and
wherein the riding pattern information is generated further based on at least one of a parking lot of a moving object, a number of passengers of a moving object in use, age and sex of a passenger, or body information of a passenger.

12. The method of claim 10, further comprising, after the allocating of the moving object, designating a zone for returning the moving object and a parking lot in the zone based on at least one of the life pattern information or the riding pattern information.

13. The method of claim 12, further comprising, after the designating of the parking lot, when another moving object enters the fleet spot for return before the moving object finishes being used, directing the return to a parking lot different from the designated parking lot.

14. The method of claim 1, further comprising:
after the allocating of the moving object,
receiving, by the server, current location information of the user device, when the use of the moving object starts within a predetermined time;
transmitting, by the server, a route from the current location information to the fleet spot to the user device; and
transmitting, by the server, a route from current location information in the fleet spot to a parking lot of the moving object to the user device, when the user device enters the fleet spot.

15. The method of claim 14, further comprising, after the transmitting of the route to the parking lot, notifying, by the allocated moving object, a notice to a user, when the user device approaches within a predetermined distance from the parking lot.

16. A server for a fleet system having a fleet spot divided into a multiplicity of zones provided as accommodating space of a moving object, the server comprising:
a transceiver configured to transmit and receive a signal; and
a processor configured to control the transceiver,
wherein the processor is further configured to
register moving objects to be shared in the fleet system,
communicate with the moving objects to periodically receive state information of the moving objects in real time,
allocate each moving object to use and to be placed in a zone of the multiplicity of zones by considering environment information of a neighboring area of each zone, based on a type of the moving object and the state information of the moving object, receive a use request of the moving object from a user device, receive a real-time user location of the user device from a location sensor of the user device until the moving object is handed over, configure riding pattern information of the moving object based on the zone used by the moving object, update the riding pattern information of the moving object in response to the riding pattern information of the moving object obtained by the user device in real time, generate an available moving object list comprising i) a moving object satisfying the updated riding pattern information of the moving object, ii) the zone used by the moving object; and iii) at least one zone in compliance with the use request and an available moving object of the at least one zone in compliance with the use request, wherein the use request includes the real-time user location of the user device, transmit an available moving object list to the user device, receive reservation information based on a moving object that the user device selects in the available moving object list, allocate the moving object to the user device based on the reservation information, and move the moving object with autonomous driving function to the real-time user location of the user device, wherein the available moving object list is generated to further comprise a moving object to be returned and a zone of return before a predetermined time of the time to use the moving object in the use request, and wherein, when allocating the moving object by receiving reservation information based on the moving object to be returned, the processor is further configured to instruct the moving object to be returned to move to a non-designated zone that is different from the zone of return and is near the real-time user location of the user device, when a distance between the zone of return of the moving object and the real-time user location of the user device at the time to use the moving object exceeds a predetermined range, and approve return processing and subsequent use processing as a normal request, when handover of the moving object in the non-designated zone different from the zone of return is confirmed.

17. The server of claim 16, wherein a type, a detailed classification and a number of moving objects allocated to use the zones are determined based on surrounding information of a zone comprising at least one of a facility located around the zone, a settled population, or a floating population.

18. The server of claim 16, wherein the use request is a message that is generated based on time to use a moving object, and wherein the use request is a message that is generated by further comprising at least one among location information of a user, a type of the moving object, history information, preference information, or rating information.

19. A fleet system having a fleet spot divided into a multiplicity of zones provided as accommodating space of a moving object, the fleet system comprising:

a server configured to manage the fleet system;

at least one user device registered to the fleet system; and at least one moving object registered to the fleet system, wherein the server is further configured to register moving objects to be shared in the fleet system, communicate with the moving objects to periodically receive state information of the moving objects in real time, allocate each moving object to use and to be placed in a zone of the multiplicity of zones by considering environment information of a neighboring area of each zone, based on a type of the moving object and the state information of the moving object, receive a use request of the moving object from a user device, receive a real-time user location of the user device from a location sensor of the user device until the moving object is handed over, configure riding pattern information of the moving object based on the zone used by the moving object, update the riding pattern information of the moving object in response to the riding pattern information of the moving object obtained by the user device in real time, generate an available moving object list comprising i) a moving object satisfying the updated riding pattern information of the moving object, ii) the zone used by the moving object; and iii) at least one zone in compliance with the use request and an available moving object of the at least one zone in compliance with the use request, wherein the use request includes the real-time user location of the user device, transmit an available moving object list to the user device, receive reservation information based on a moving object that the user device selects in the available moving object list, allocate the moving object to the user device based on the reservation information, and move the moving object with autonomous driving function to the real-time user location of the user device, wherein the available moving object list is generated to further comprise a moving object to be returned and a zone of return before a predetermined time of the time to use the moving object in the use request, and wherein, when allocating the moving object by receiving reservation information based on the moving object to be returned, the server is further configured to instruct the moving object to be returned to move to a non-designated zone that is different from the zone of return and is near the real-time user location of the user device, when a distance between the zone of return of the moving object and the real-time user location of the user device at the time to use the moving object exceeds a predetermined range, and approve return processing and subsequent use processing as a normal request, when handover of the moving object in the non-designated zone different from the zone of return is confirmed.

* * * * *